US010020749B2

(12) United States Patent
Jin et al.

(10) Patent No.: US 10,020,749 B2
(45) Date of Patent: Jul. 10, 2018

(54) POWER CONVERSION UNIT

(71) Applicant: LG Innotek Co., Ltd., Seoul (KR)

(72) Inventors: Chunfeng Jin, Seoul (KR); Joo Suk Kang, Seoul (KR); Jae Sam Lee, Seoul (KR); Jung Hwan Choi, Seoul (KR); Dong Young Huh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/526,223

(22) PCT Filed: Aug. 24, 2015

(86) PCT No.: PCT/KR2015/008842
§ 371 (c)(1),
(2) Date: May 11, 2017

(87) PCT Pub. No.: WO2016/076517
PCT Pub. Date: May 19, 2016

(65) Prior Publication Data
US 2017/0317601 A1     Nov. 2, 2017

(30) Foreign Application Priority Data

Nov. 11, 2014   (KR) .................. 10-2014-0156204

(51) Int. Cl.
*H02M 3/335*   (2006.01)
*H02M 1/08*    (2006.01)
*H02M 1/00*    (2006.01)

(52) U.S. Cl.
CPC ......... *H02M 3/33546* (2013.01); *H02M 1/08* (2013.01); *H02M 2001/0058* (2013.01)

(58) Field of Classification Search
CPC .... H02M 1/08; H02M 1/088; H02M 3/33553; H02M 3/33579; H02M 3/33546; H02M 2001/0058
See application file for complete search history.

(56) References Cited

U.S. PATENT DOCUMENTS 5,781,420 A  *  7/1998  Xia ................... H02M 3/33576
                                                  363/16
6,882,548 B1 *  4/2005  Jacobs ................... H02M 1/34
                                                  363/127

(Continued)

FOREIGN PATENT DOCUMENTS

JP   2009055747 A   3/2009
JP   2010213430 A   9/2010
(Continued)

OTHER PUBLICATIONS

International Search Report in International Application No. PCT/KR2015/008842, filed Aug. 24, 2015.

*Primary Examiner* — Jue Zhang
*Assistant Examiner* — Lakaisha Jackson
(74) *Attorney, Agent, or Firm* — Saliwanchik, Lloyd & Eisenschenk

(57) ABSTRACT

The present invention relates to a power converter including a transformer; a current doubler including a switch element and connected to a secondary side of the transformer to double a current of the transformer according to an operation of the switch element; and a voltage resonator connected to the switch elements, wherein the voltage resonator includes a switch element and a capacitor which are connected to each other in series.

18 Claims, 21 Drawing Sheets

(56) References Cited

U.S. PATENT DOCUMENTS

| | | | |
|---|---|---|---|
| 9,716,439 B2* | 7/2017 | Quaglino | H02M 3/33592 |
| 2009/0059622 A1 | 3/2009 | Shimada et al. | |
| 2009/0154204 A1* | 6/2009 | Taylor | H02M 3/33592 |
| | | | 363/52 |
| 2010/0232180 A1 | 9/2010 | Sase et al. | |
| 2011/0242854 A1 | 10/2011 | Minami et al. | |
| 2011/0317452 A1 | 12/2011 | Anguelov et al. | |
| 2013/0100707 A1* | 4/2013 | Hatakeyama | H02M 3/3376 |
| | | | 363/17 |
| 2016/0079869 A1* | 3/2016 | Elias-Palacios | H02M 3/33546 |
| | | | 363/21.04 |

FOREIGN PATENT DOCUMENTS

| | | |
|---|---|---|
| JP | 2011217566 A | 10/2011 |
| JP | 2013240168 A | 11/2013 |
| KR | 20110029756 A | 3/2011 |
| KR | 101452461 B1 | 11/2014 |

* cited by examiner

FIG.1
Prior Art
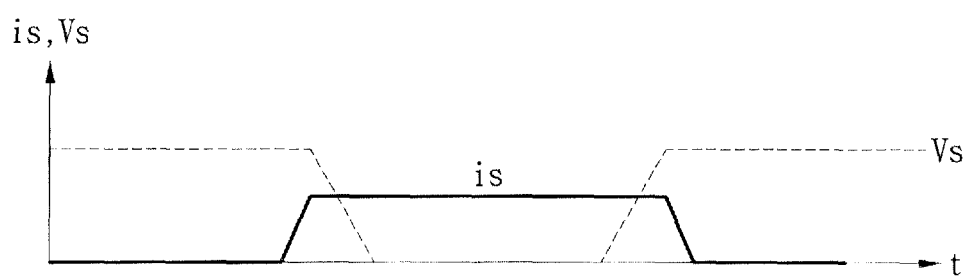
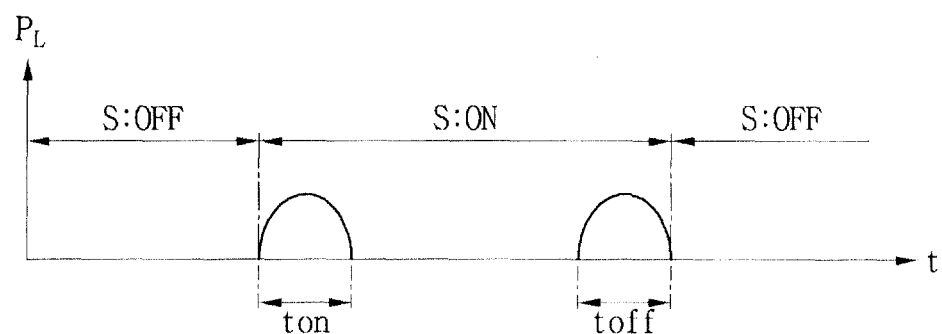

POWER CONVERSION UNIT

CROSS-REFERENCE TO RELATED APPLICATIONS

This application is the U.S. national stage application of International Patent Application No. PCT/KR2015/008842, filed Aug. 24, 2015, which claims priority to Korean Application No. 10-2014-0156204, filed Nov. 11, 2014, the disclosures of each of which are incorporated herein by reference in their entirety.

TECHNICAL FIELD

The present invention relates to a power converter, and more particularly, to a DC-DC converter.

BACKGROUND ART

In a power supply for stably supplying electric power to electronic devices, higher reliability thereof is required while a capacity thereof is continuously increased. In such a power supply, it is important not only to stably supply electric power required in a system, but also to minimize a necessary space. Therefore, in order to minimize the space required by the system, it is necessary to reduce sizes of unnecessary elements such as a heat sink by increasing power conversion efficiency while making the power supply smaller, lighter and thinner. Generally, a switching power supply has low power conversion efficiency due to a switch loss, and thus various power conversion techniques for improving the power conversion efficiency have been developed.

For example, a resonance type power converter is a power converter having high efficiency even in a high frequency range by making a voltage or a current of a switch zero at the moment of switching and minimizing the switching loss. In the resonance type power converter, a resonance switch may be constituted by adding a capacitor and an inductor which cause resonance to a switch element.

The resonance type power converter initially started to be applied to DC power supplies, inverters or the like in aviation and space fields which require a small size and a light weight, and the application thereof has recently extended to industrial fields. Such a resonance type power converter is classified into a series resonance type converter and a parallel resonance type converter according to a resonance type. A quasi-resonance type converter and a multi-resonance type converter having a small number of switches are used in a small-sized power supply. A resonance type inverter with a resonant link has been studied for an AC power supply and is applicable to a power system requiring a high frequency. Meanwhile, a soft switching converter of a pulse width modulation (PWM) converter type which minimizes resonance energy by performing zero voltage or zero current switching only during switching is also being studied.

A switch constituting such a power converter is a switch element as a semiconductor element, and a loss occurs due to an emergency characteristic of the switch element when the switch element is turned on and off.

FIG. 1 is a waveform diagram illustrating a power loss of a switch element.

Referring to FIG. 1, a power loss PL of a switch element is increased, as the turn-on time ton and the turn-off time toff of the switch element become longer and also increased in proportion to a switching frequency. However, in order to reduce a size and a weight of a power supply, a switch element of a power converter is generally switched at a high frequency, but the high-frequency switching of the switch element increases a loss due to the switching. The switching loss has a problem of lowering the power conversion efficiency. Also, in a power conversion system such as new renewable energy and an electric car, bidirectional power conversion is required. At this time, bidirectional power control is implemented by one power stage to simplify the system and also to reduce a cost thereof. However, due to a leakage inductance between a primary side winding and a secondary side winding of an insulation transformer included in the bidirectional power conversion system, when the high frequency switching is performed, the switching loss is increased and a surge voltage is generated. Therefore, in the power converter, there is a problem that the power conversion loss and a voltage stress applied to the switch are increased.

DISCLOSURE

Technical Problem

The present invention is directed to providing a power converter which realizes a voltage clamp operation and a soft switching operation of a switch element when bidirectional power conversion is performed, thereby realizing high efficiency of power conversion and low noise according to reduction of switching loss.

Technical Solution

One aspect of the present invention provides a power converter including a transformer; a current doubler including a switch element and connected to a secondary side of the transformer to double a current of the transformer according to an operation of the switch element; and a voltage resonator connected to the switch elements, wherein the voltage resonator includes a switch element and a capacitor which are connected to each other in series.

Also, in the power converter according to one embodiment of the present invention, the switch element of the current doubler may include first and second switch elements, and the voltage resonator may include a first voltage resonator which is connected to the first switch element and a second voltage resonator which is connected to the second switch element, and the first voltage resonator may include a third switch element and a first capacitor which are connected to each other in series, and the second voltage resonator may include a fourth switch element and a second capacitor which are connected to each other in series.

Also, in the power converter according to another embodiment of the present invention, the first switch element and the third switch element may be alternately operated with a dead time, and the second switch element and the third switch element may be alternately operated with a dead time.

Also, in the power converter according to still another embodiment of the present invention, the power converter may further include an inverter rectification type converter which is connected to a primary side of the transformer, converts an input voltage into a square wave pulse waveform and then outputs the converted square wave pulse waveform to the primary side of the transformer.

Also, in the power converter according to yet another embodiment of the present invention, the power converter may further include a load part which is connected to both ends of the current doubler, and a step-down operation which reduces a level of a DC voltage input to the inverter rectification type converter and then outputs the DC voltage from the load part or a step-up operation which increases a level of a DC voltage input to the load part and then outputs the DC voltage from the inverter rectification type converter may be performed.

Also, in the power converter according to yet still another embodiment of the present invention, a current flowing in each of the third and fourth switch element may be resonated when the step-down operation or the step-up operation is performed.

Also, in the power converter according to yet still another embodiment of the present invention, a voltage applied to both ends of each of the first and second voltage resonators may have a sine wave when the step-down operation is performed.

Also, in the power converter according to yet still another embodiment of the present invention, the current doubler may include first and second inductors each of which one terminal is connected to each other, and the other terminal of the first inductor may be connected to one terminal of the secondary side of the transformer, and the other terminal of the second inductor may be connected to the other terminal of the secondary side of the transformer, and a current flowing in each of the first and second inductors and a resonant current flowing in the third switch element may flow in the second switch element when the step-down operation or the step-up operation is performed.

Also, in the power converter according to yet still another embodiment of the present invention, when the step-down operation or the step-up operation is performed, the second and third switch elements may be connected, and the first and fourth switch elements may be disconnected, and thus the current flowing in each of the first and second inductors and the resonant current flowing in the third switch element may flow in the second switch element.

Also, in the power converter according to yet still another embodiment of the present invention, the current doubler may include first and second inductors each of which one terminal is connected to each other, and the other terminal of the first inductor may be connected to one terminal of the secondary side of the transformer, and the other terminal of the second inductor may be connected to the other terminal of the secondary side of the transformer, and a current flowing in each of the first and second inductors and a resonant current flowing in the fourth switch element may flow in the first switch element when the step-down operation or the step-up operation is performed.

Also, in the power converter according to yet still another embodiment of the present invention, when the step-down operation or the step-up operation is performed, the first and fourth switch elements may be connected, and the second and third switch elements may be disconnected, and thus the current flowing in each of the first and second inductors and the resonant current flowing in the fourth switch element may flow in the first switch element.

Another aspect of the present invention provides a power converter including an insulation transformer; fifth and seventh switch elements connected between one terminal of a secondary side of the insulation transformer and a first node; a first inductor connected between one terminal of the secondary side of the insulation transformer and a second node; a second inductor connected between the other terminal of the secondary side of the insulation transformer and the second node; a first resonator connected to the fifth switch element in parallel and including a sixth switch element and a first capacitor; and a second resonator connected to the seventh switch element in parallel and including an eighth switch element and a second capacitor.

Also, in the power converter according to one embodiment of the present invention, the sixth switch element and the first capacitor may be connected in series, and the eighth switch element and the second capacitor may be connected in series.

Also, in the power converter according to another embodiment of the present invention, the power converter may further include an inverter rectification type converter which is connected to a primary side of the insulation transformer, converts an input voltage into a square wave pulse waveform and then outputs the converted square wave pulse waveform to the primary side of the transformer.

Also, in the power converter according to still another embodiment of the present invention, the inverter rectification type converter may be a full bridge circuit including first to fourth switch elements.

Also, in the power converter according to yet another embodiment of the present invention, the power converter may further include a load capacitor which is connected between the first and second nodes.

Also, in the power converter according to yet still another embodiment of the present invention, a step-down operation which reduces a level of a DC voltage input to the inverter rectification type converter and then outputs the DC voltage from the load part or a step-up operation which increases a level of a DC voltage input to the load part and then outputs the DC voltage from the inverter rectification type converter may be performed.

Also, in the power converter according to yet still another embodiment of the present invention, the power converter may further include a primary side inductor which is connected to the primary side of the insulation transformer.

Also, in the power converter according to yet still another embodiment of the present invention, each of the fifth to eighth switch elements may include an internal diode and an internal capacitor.

Also, in the power converter according to yet still another embodiment of the present invention, the fifth to eighth switch elements may be MOSFET transistors, and drain terminals of the fifth and seventh switch elements and source terminals of the sixth and eighth switch elements may be commonly connected to one terminal of the insulation transformer.

DESCRIPTION OF DRAWINGS

FIG. 1 is a waveform diagram illustrating a power loss of a switch element.

MODES OF THE INVENTION

Figure 2A:
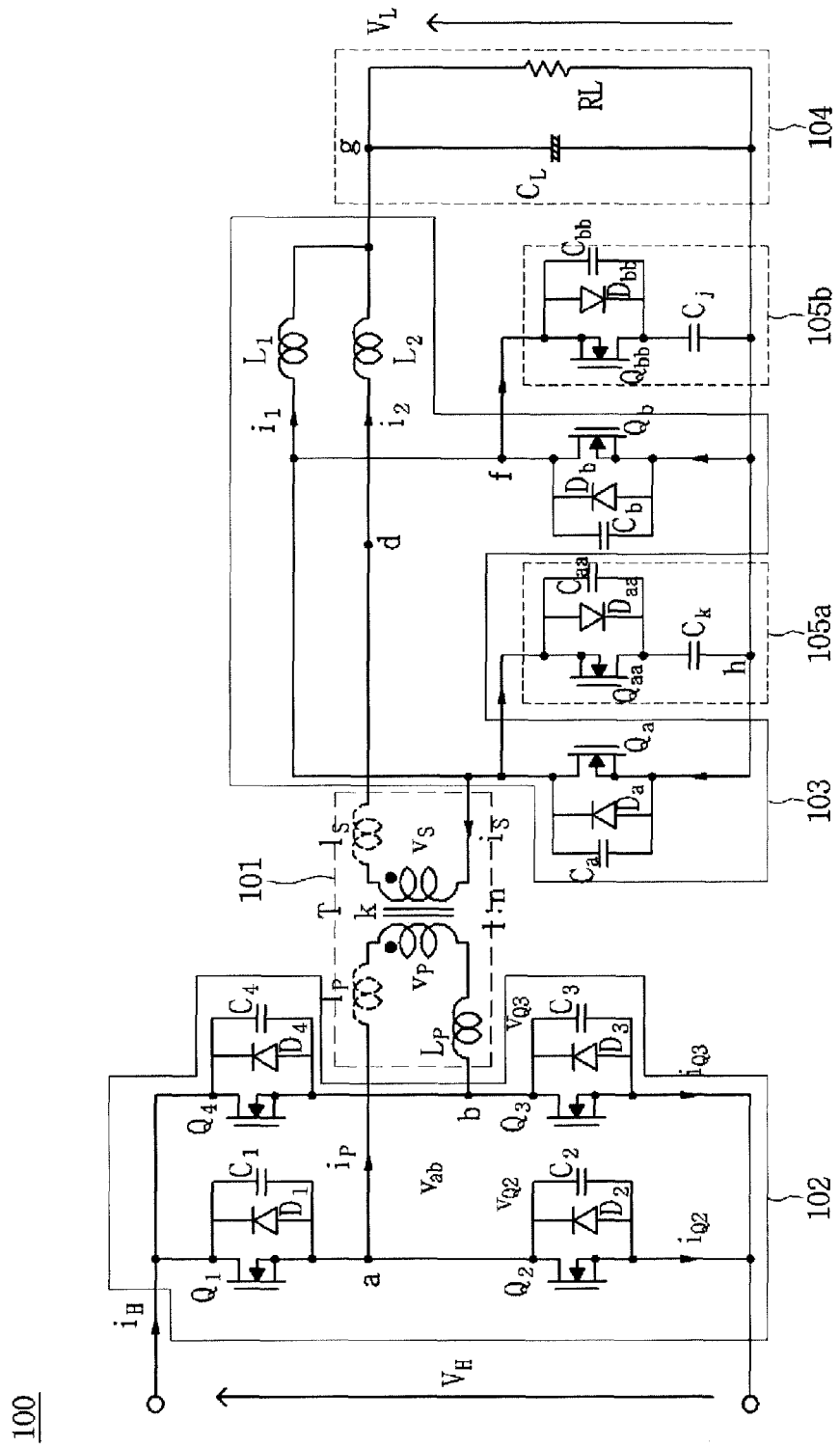
FIGS. 2A and 2B illustrate a power converter according to an embodiment of the present invention.

Hereinafter, a power converter according to embodiments of the present invention will be described in detail with reference to accompanying drawings. The exemplary embodiments described below are provided as examples to sufficiently transfer the spirits of the invention to those skilled in the art. Accordingly, the present invention is not limited to those embodiments described below and can be embodied in different forms. In addition, in the drawings, explanatorily irrelevant portions are omitted to clearly describe the present invention, and the width, the length and the thickness of an element could be exaggerated for convenience. Throughout the disclosure, like reference numerals refer to like parts throughout the various figures and embodiments of the present invention.

Figure 2B:
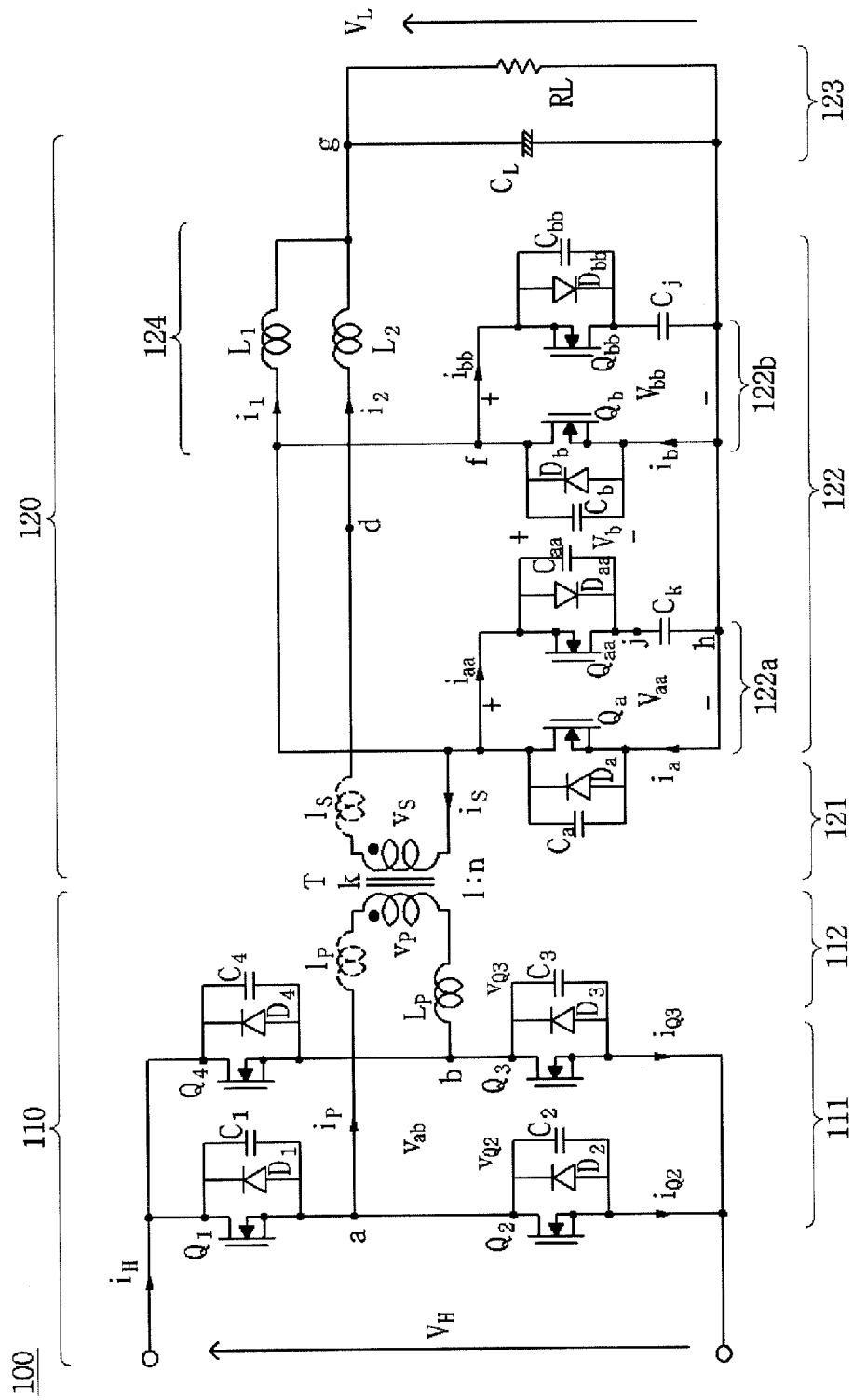

FIGS. 2A and 2B illustrate a power converter according to an embodiment of the present invention.

<Power Converter>

Referring to FIG. 2A, a power converter 100 according to an embodiment of the present invention is a bidirectional power converter which converts a DC voltage into a DC voltage and may include an insulation transformer 101, an inverter rectification type converter 102 which is connected to a primary side of the insulation transformer 101, a current doubler 103 which is connected to a secondary side of the insulation transformer 101, a load part 104 which is connected to the current doubler 103, and first and second voltage resonators 105a and 105b which are connected to the current doubler 103.

A leakage inductance lp of the insulation transformer 101 may be equivalently connected to the primary side of the insulation transformer 101, and a primary side inductor Lp other than the leakage inductance lp may be connected thereto. And a leakage inductance ls of the insulation transformer 101 may be equivalently connected to the secondary side of the insulation transformer 101.

The inverter rectification type converter 102 may be a half bridge circuit type, a full bridge circuit type or a push-pull circuit type. And the inverter rectification type converter 102 may be connected to the primary side of the insulation transformer 101, may convert an input voltage to a square wave pulse waveform and then may output the converted square wave pulse waveform to the primary side of the insulation transformer 101. The full bridge circuit will be described as an example of the inverter rectification type converter 102. A full bridge part 102 which is the inverter rectification type converter may be connected between a first power source VH from which a voltage is supplied and an a-b terminal which is the primary side of the insulation transformer 101, may include first to fourth switch elements Q1, Q2, Q3 and Q4 and may convert the first power source VH which is a DC power source into a square wave pulse waveform according to a switching operation of the first to fourth switch elements Q1, Q2, Q3 and Q4. Also, the full bridge part 102 may be a phase shift full bridge circuit.

The current doubler 103 may be connected between a d-c terminal which is the secondary side of the insulation transformer 101 and the load part 104 and may include first and second inductors L1 and L2 and fifth and seventh switch elements Qa and Qb. The current doubler 103 may serve to double a current of the insulation transformer 101 according to an operation of the fifth and seventh switch elements Qa and Qb.

The first voltage resonator 105a may be connected to both ends of the fifth switch element Qa of the current doubler 103 and may include a sixth switch element Qaa and a first resonant capacitor Ck which is connected to the sixth switch element Qaa in series. Also, the second voltage resonator 105b may be connected to both ends of the seventh switch element Qb and may include an eighth switch element Qbb and a second resonant capacitor Cj which is connected to the eighth switch element Qbb in series. And the fifth switch element Qa and the sixth switch element Qaa may be alternately operated with a dead time, and the seventh switch element Qb and the eighth switch element Qbb may also be alternately operated with a dead time.

The load part 104 may be connected to the current doubler 103 and may include a load capacitor CL and a load resistor RL which are connected to each other in parallel, and a voltage at both ends of the load resistor RL may be a second voltage VL.

The power converter 100 may convert a level of a first voltage VH which is a DC voltage and may output the converted voltage as the second voltage VL which is a DC voltage. At this time, a step-down operation which reduces the level of the first voltage VH and outputs it as the second voltage VL may be performed. And the power converter 100 may convert a level of the second voltage VL which is the DC voltage and may output the converted voltage as the first voltage VH which is the DC voltage. At this time, a step-up operation which increases the level of the second voltage VL and outputs it as the first voltage VH may be performed.

Also, the first and second voltage resonators 105a and 105b may allow the fifth and seventh switch elements Qa and Qb of the current doubler 103 to perform a zero voltage switching operation according to a voltage resonance and thus may minimize a switching loss and may also allow the fifth and seventh switch elements Qa and Qb of the current doubler 103 to perform a zero current switching operation according to a current resonance using the first and second voltage resonators 105a and 105b, the first and second inductors L1 and L2 of the current doubler 103 and a leakage inductance ls of a secondary side transformer, may minimize a switching loss of the entire power converter 100 and thus may increase power conversion efficiency.

Hereinafter, the power converter 100 according to the embodiment of the present invention will be described in detail with reference to FIG. 2B.

Referring to FIG. 2B, the power converter 100 according to the embodiment of the present invention may include a primary side converter 110 and a secondary side converter 120. The power converter 100 which is a converter in which a DC input voltage is converted into the square wave pulse waveform by an ON/OFF operation of the switch element and then rectified and smoothed through a transformer and thus a DC output voltage is obtained may use energy accumulated in an inductor. Also, the power converter 100 may include an insulation transformer to be electrically insulated between an input and an output.

The primary side converter 110 may include a full bridge circuit 111 and a primary side transformer 112. The full bridge circuit 111 may include first to fourth switch elements Q1, Q2, Q3 and Q4. The first to fourth switch elements Q1, Q2, Q3 and Q4 may include internal diodes D1, D2, D3 and D4 and internal capacitors C1, C2, C3 and C4 therein, respectively. The primary side transformer 112 may include a parasitic inductance lp in series. The primary side transformer 112 may include a separate primary side inductor Lp in series.

In a connection relationship of elements constituting the full bridge circuit 111, the full bridge circuit 111 is connected to a port of a first power source Vh. And the first switch Q1 is connected between one terminal of the first power source Vh and an a node, the second switch Q2 is connected between the a node and the other terminal of the first power source Vh, the fourth switch Q4 is connected between the one terminal of the first power source Vh and an b node, and the third switch Q3 is connected between the other terminal of the first power source Vh and the b node.

In a connection relationship of the primary side transformer 112, the primary side transformer 112 may include the parasitic inductance lp in series. Alternatively, the primary side transformer 112 may include the parasitic inductance lp and the primary side inductor Lp in series and may be connected between the a node and the b node. And a voltage of the primary side transformer 112 was designated by vp, and a voltage between the a node and the b node was designated by vab. Also, a current flowing in the primary side transformer 112 was designated by ip.

The secondary side converter 120 may include a secondary side transformer 121, a secondary side resonator 122, a load part 123 and an inductor part 124.

The secondary side transformer 121 may be magnetically coupled to the primary side transformer 112, and when the number of windings in the primary side transformer 112 is 1, that in the secondary side transformer 121 may be n. Therefore, the power converter 100 may include a transformer T having a turn ratio of 1:n. Further, the secondary side transformer 121 may include a parasitic inductance ls in series. The secondary side transformer 121 may be connected between a c node and a d node.

The secondary side resonator 122 may include a first resonator 122a and a second resonator 122b.

The first resonator 122a may be connected between the c node and an h node. The first resonator 122a may include a fifth switch Qa, a sixth switch Qaa and a ninth capacitor Ck. The fifth switch Qa may include a body diode Da and a body capacitor Ca and may be connected between the c node and the h node. And the sixth switch Qaa may include a body diode Daa and a body capacitor Caa and may be connected between the c node and a j node. The ninth capacitor Ck may be connected between the j node and the h node and may be connected to the sixth switch Qaa in series.

The second resonator 122b may be connected between an f node and the h node. The second resonator 122b may include a seventh switch Qb, an eighth switch Qbb and a tenth capacitor Cj. The seventh switch Qb may include a body diode Db and a body capacitor Cb and may be connected between the f node and the h node. And the eighth switch Qbb may include a body diode Dbb and a body capacitor Cbb and may be connected between the f node and a k node. The tenth capacitor Cj may be connected between the k node and the h node and may be connected to the eighth switch Qbb in series.

The inductor part 124 may serve to form resonance together with the secondary side resonator 122. The inductor part 124 may include a first inductor L1 which is connected between the c node and a g node and a second inductor L2 which is connected between the d node and the g node. Therefore, one terminal of the first inductor L1 may be connected to one terminal of the secondary side transformer 121, and the other terminal thereof may be connected to the second inductor L2. And one terminal of the second inductor L2 may be connected to the first inductor L1, and the other terminal thereof may be connected to the other terminal of the secondary side transformer 121.

The load part 123 may include a load capacitor CL and a load resistor RL which are connected to each other in parallel. The load part 123 may be connected between the g node and the h node, and a voltage at both ends of the load part 123 is a second voltage VL.

The first to eighth switch elements Q1, Q2, Q3, Q4, Qa, Qaa, Qb and Qbb may be MOSFET transistors, and a source terminal of the first switch element Q1 and a drain terminal of the second switch element Q2 may be commonly connected to the a node, a source terminal of the fourth switch element Q4 and a drain terminal of the third switch element Q3 may be commonly connected to the b node, a source terminal of the fifth switch element Qa may be connected to the h node, a source terminal of the sixth switch element Qaa may be connected to the c node, a source terminal of the seventh switch element Qb may be connected to the h node, and a source terminal of the eighth switch element Qbb may be connected to the f node. And a cathode terminal of each of internal diodes D1, D2, D3, D4, Da, Daa, Db and Dbb which is connected to each of the first to eighth switch elements Q1, Q2, Q3, Q4, Qa, Qaa, Qb and Qbb may be connected to the drain terminal, and an anode terminal thereof may be connected to the source terminal. And each of internal capacitors C1, C2, C3, C4, Ca, Caa, Cb and Cbb may be connected between the source terminal and the drain terminal of each of the first to eighth switch elements Q1, Q2, Q3, Q4, Qa, Qaa, Qb and Qbb.

<Forward Operation of Power Converter: Buck Mode Operation>

Figure 3:
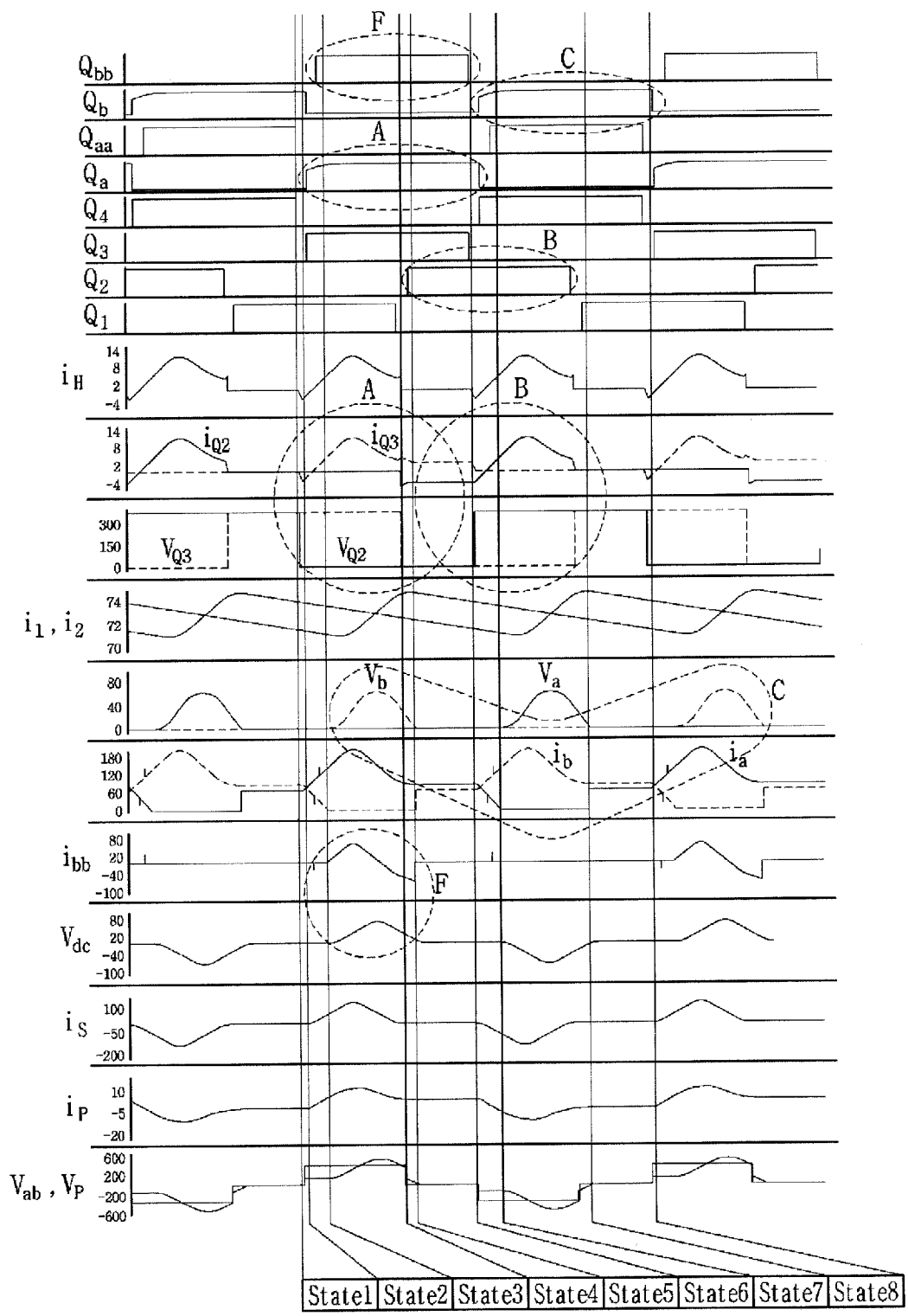
FIG. 3 is a waveform diagram of a buck mode operation of the power converter according to the embodiment of the present invention.

FIG. 3 is a waveform diagram of a buck mode operation of the power converter according to the embodiment of the present invention.

In the waveform diagram, Qbb, Qb, Qaa, Qa, Q4, Q3, Q2 and Q1 are drive signals for driving the switch elements, and signals therebelow indicate voltage and current waveforms of each of the switch elements according to the driving of the switch elements.

Referring to FIG. 3, the power converter 100 according to the embodiment of the present invention may perform a buck mode operation in which a first voltage VH which is an input voltage is converted into a second voltage V2 which is a DC output voltage lower than the input voltage.

At this point, the load part 123 and the inductor part 124 may serve as filters which filter an AC component and may be referred to as one low pass filter.

In the buck mode operation, an operation of the power converter 100 may be divided into first to eighth time sections State 1 to State 8. In an operation relationship of each of the switch elements in the first to eighth time sections State 1 to State 8, the first and second switch elements Q1 and Q2 of the first to fourth switch elements Q1, Q2, Q3 and Q4 may be alternately operated, and the third and fourth switch elements Q3 and Q4 may be alternately operated, and they may be operated with a predetermined dead time. Further, the fifth and sixth switch elements Qa and Qaa may be alternately operated, and the seventh and eighth switch elements Qb and Qbb may be alternately operated, and they may be operated with a predetermined dead time.

<First Time Section State 1>

During the first time section State 1, the first switch element Q1 is turned on, the second switch element Q2 is turned off, the third switch element Q3 is turned off, the fourth switch element Q4 may be turned off at the start of the first time section State 1. And the fifth switch element Qa is turned off, the sixth switch element Qaa is turned off at the start of the first time section State 1, the seventh switch element Qb is turned on, and the eighth switch element Qbb may be turned off.

<Second Time Section State 2>

During the second time section State 2, the first switch element Q1 is turned on, the second switch element Q2 is turned off, the third switch element Q3 may be turned off and then turned on, the fourth switch element Q4 is turned off, the fifth switch element Qa may be turned off and then turned on, the sixth switch element Qaa is turned off, the seventh switch element Qb may be turned on and then turned off, and the eighth switch element Qbb may be turned off and then turned on.

<Third Time Section State 3>

During the third time section State 3, the first switch element Q1 is turned on, the second switch element Q2 is turned off, the third switch element Q3 is turned on, the fourth switch element Q4 is turned off, the fifth switch element Qa is turned on, the sixth switch element Qaa. is turned off, the seventh switch element Qb is turned off, and the eighth switch element Qbb is turned on.

<Fourth Time Section State 4>

During the fourth time section State 4, the first switch element Q1 is turned off at the start of the fourth time section State 4, the second switch element Q2 is turned off and then turned on, the third switch element Q3 is turned on, the fourth switch element Q4 is turned off, the fifth switch element Qa is turned on, the sixth switch element Qaa is turned off, the seventh switch element Qb is turned off, and the eighth switch element Qbb is turned on.

<Fifth Time Section State 5>

During the fifth time section State 5, the first switch element Q1 is turned off, the second switch element Q2 is turned on, the third switch element Q3 is turned on and then turned off at the end of the fifth time section State 5, the fourth switch element Q4 is turned off, the fifth switch element Qa is turned on, the sixth switch element Qaa is turned off, the seventh switch element Qb is turned off, and the eighth switch element Qbb is turned on and then turned off at the end of the fifth time section State 5.

<Sixth Time Section State 6>

During the sixth time section State 6, the first switch element Q1 is turned off, the second switch element Q2 is turned on, the third switch element Q3 is turned off, the fourth switch element Q4 is turned off and then turned on, the fifth switch element Qa is turned on and then turned off, the sixth switch element Qaa is turned off and then turned on, the seventh switch element Qb is turned off and then turned on, and the eighth switch element Qbb is turned off.

<Seventh Time Section State 7>

During the seventh time section State 7, the first switch element Q1 is turned off and then turned on at the end of the seventh time section State 7, the second switch element Q2 is turned on and then turned off, the third switch element Q3 is turned off, the fourth switch element Q4 is turned on, the fifth switch element Qa is turned off, the sixth switch element Qaa is turned on, the seventh switch element Qb is turned on, and the eighth switch element Qbb is turned off.

<Eighth Time Section State 8>

During the eighth time section State 8, the first switch element Q1 is turned on, the second switch element Q2 is turned off, the third switch element Q3 is turned off, the fourth switch element Q4 is turned on and then turned off at the end of the eighth time section State 8, the fifth switch element Qa is turned off, the sixth switch element Qaa is turned on and then turned off at the end of the eighth time section State 8, the seventh switch element Qb is turned on, and the eighth switch element Qbb is turned off.

The above-described first to eighth time sections State 1 to State 8 may be periodically repeated.

Figure 4:
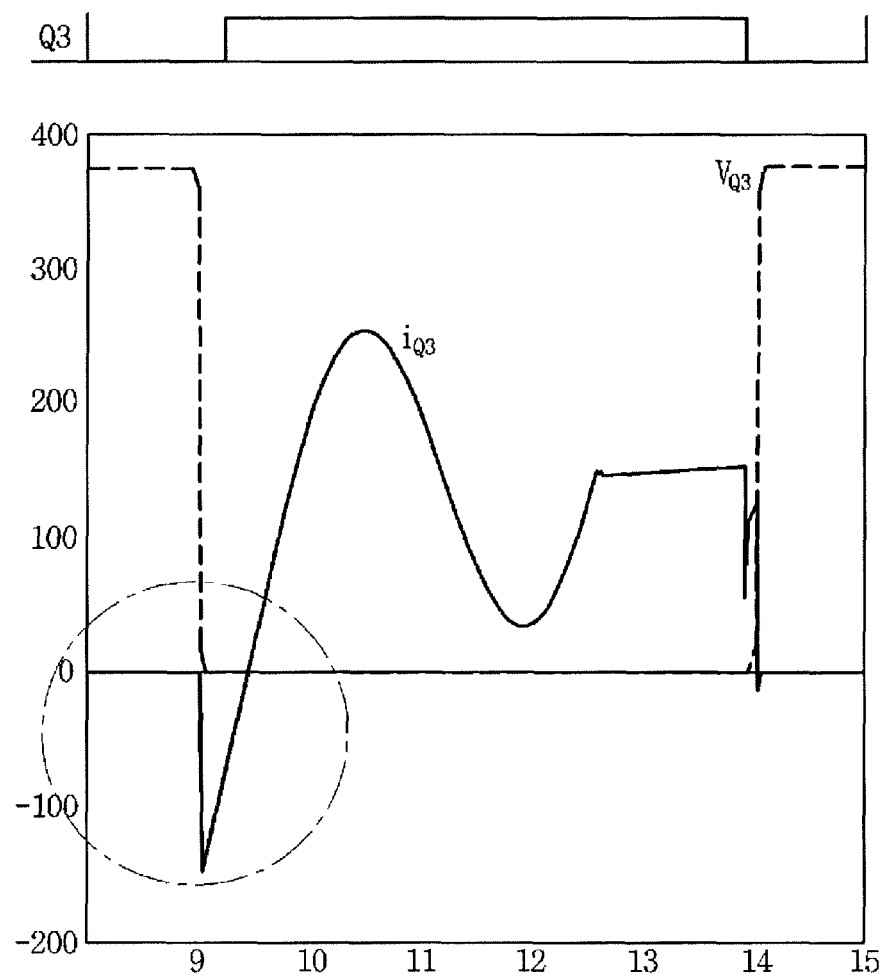
FIG. 4 is a waveform diagram enlargedly illustrating a dotted line A of FIG. 3.
Figure 5:
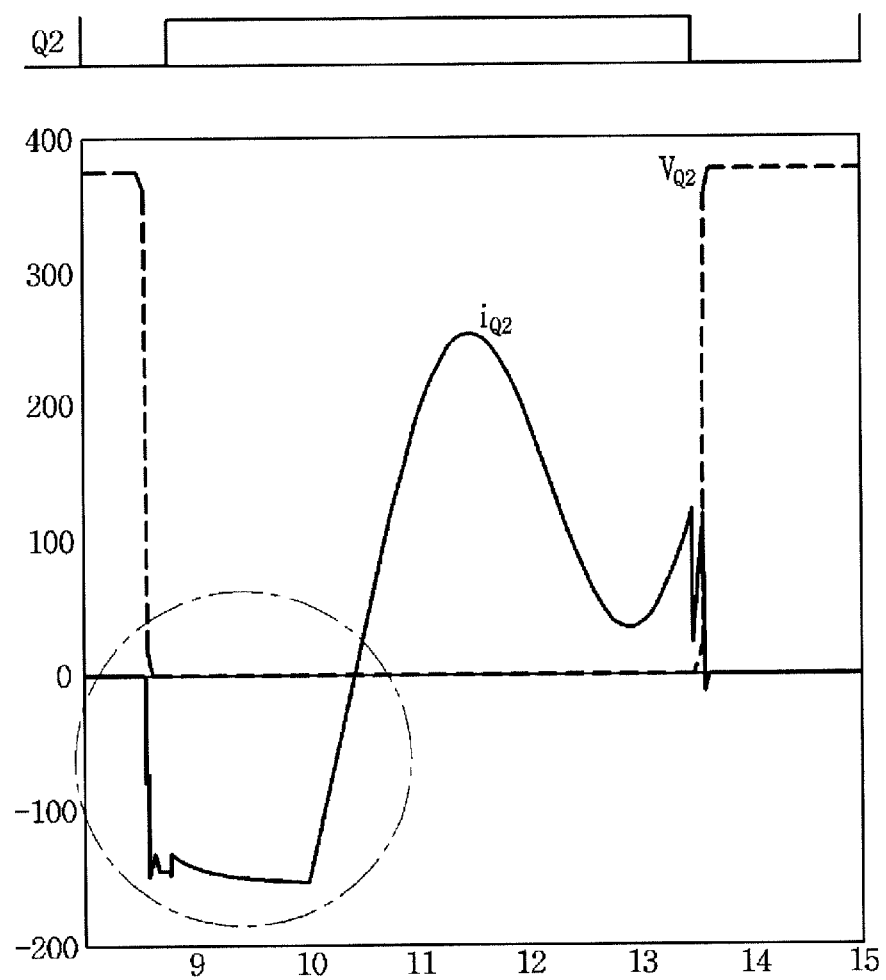
FIG. 5 is a waveform diagram enlargedly illustrating a dotted line B of FIG. 3.

FIG. 4 is a waveform diagram enlargedly illustrating a dotted line A of FIG. 3, and FIG. 5 is a waveform diagram enlargedly illustrating a dotted line B of FIG. 3.

FIGS. 4 and 5 are waveform diagrams illustrating the zero voltage switching.

In the power converter 100 according to the embodiment of the present invention, when the first to eighth switch elements Q1, Q2, Q3, Q4, Qa, Qaa, Qb and Qbb are driven according to the drive signals of the first to eighth time sections State 1 to State 8, it may be understood that the zero voltage switching is possible at a time point when the third switch element Q3 is turned on, as indicated in the dotted line of FIG. 4. Further, it may be understood that the zero voltage switching is possible at a time point when the second switch element Q2 is turned on, as indicated in the dotted line of FIG. 5.

Figure 6:
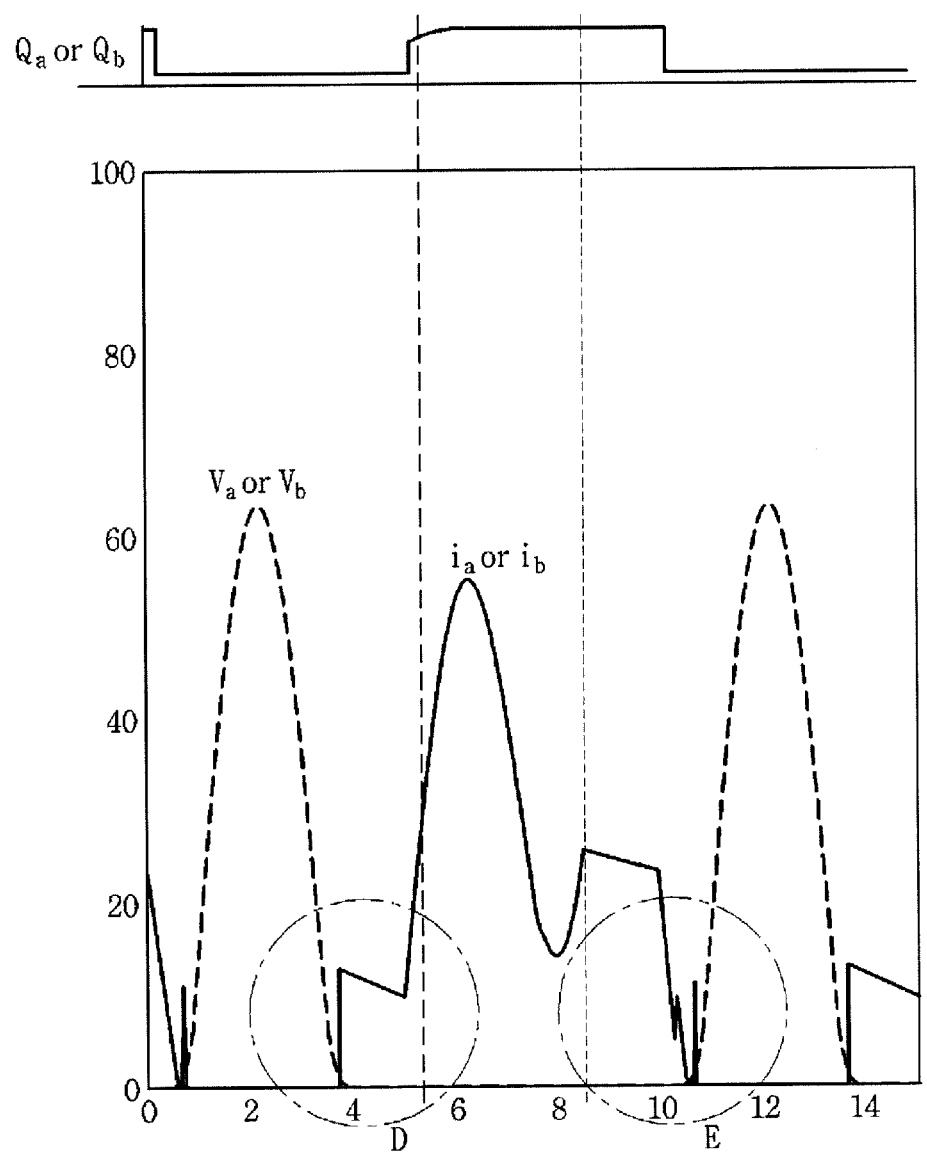
FIG. 6 is a waveform diagram enlargedly illustrating a dotted line C of FIG. 3.
Figure 7:
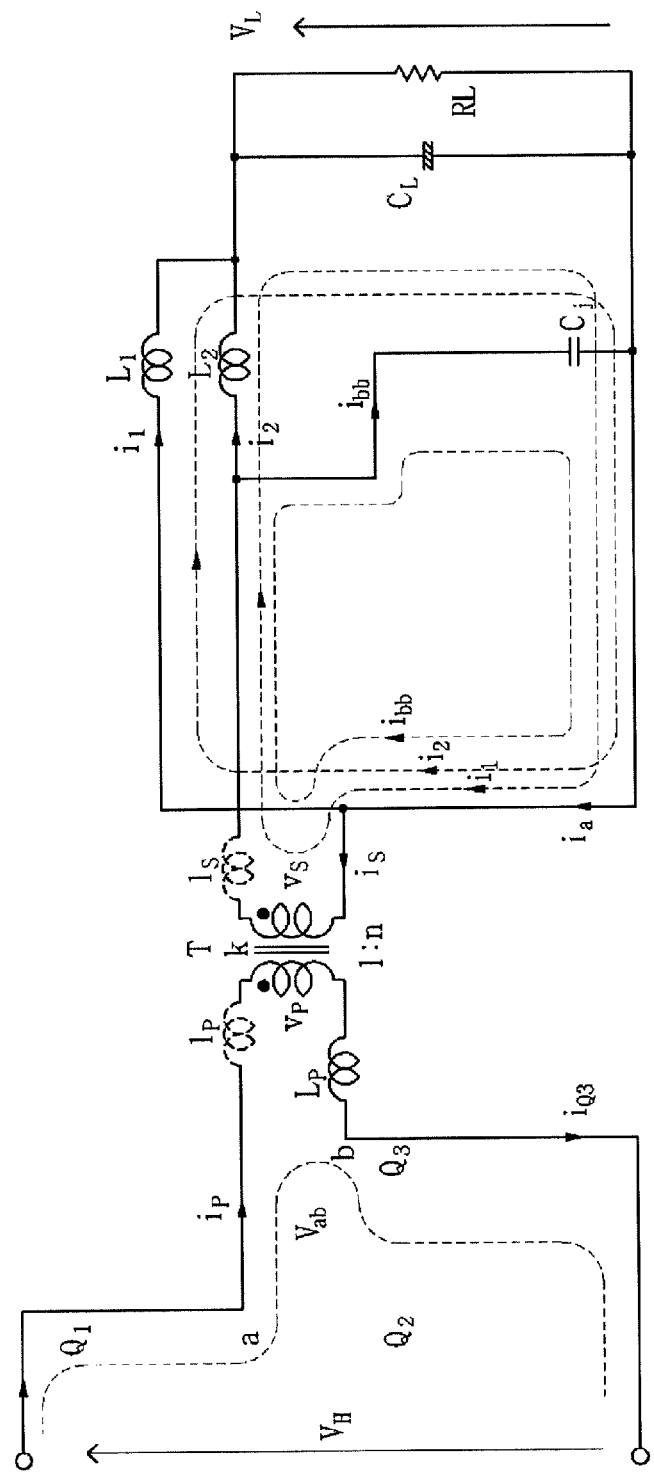
FIG. 7 is a view illustrating an equivalent circuit of the power converter in a third time section State 3.

FIG. 6 is a waveform diagram enlargedly illustrating a dotted line C of FIG. 3. And FIG. 7 is a view illustrating an equivalent circuit of the power converter in a third time section State 3. And FIG. 8 is a view enlargedly illustrating a dotted line F of FIG. 3.

FIG. 6 is an enlarged waveform diagram of a current ib flowing in the seventh switch element Qb, a voltage Vb applied to both ends of the seventh switch element Qb and the drive signal Qb of the seventh switch element Qb. However, FIG. 6 may be equally applied to a waveform diagram of a current ia flowing in the fifth switch element Qa, a voltage Va applied to both ends of the fifth switch element Qa and the drive signal Qa of the fifth switch element Qa.

Figure 8:
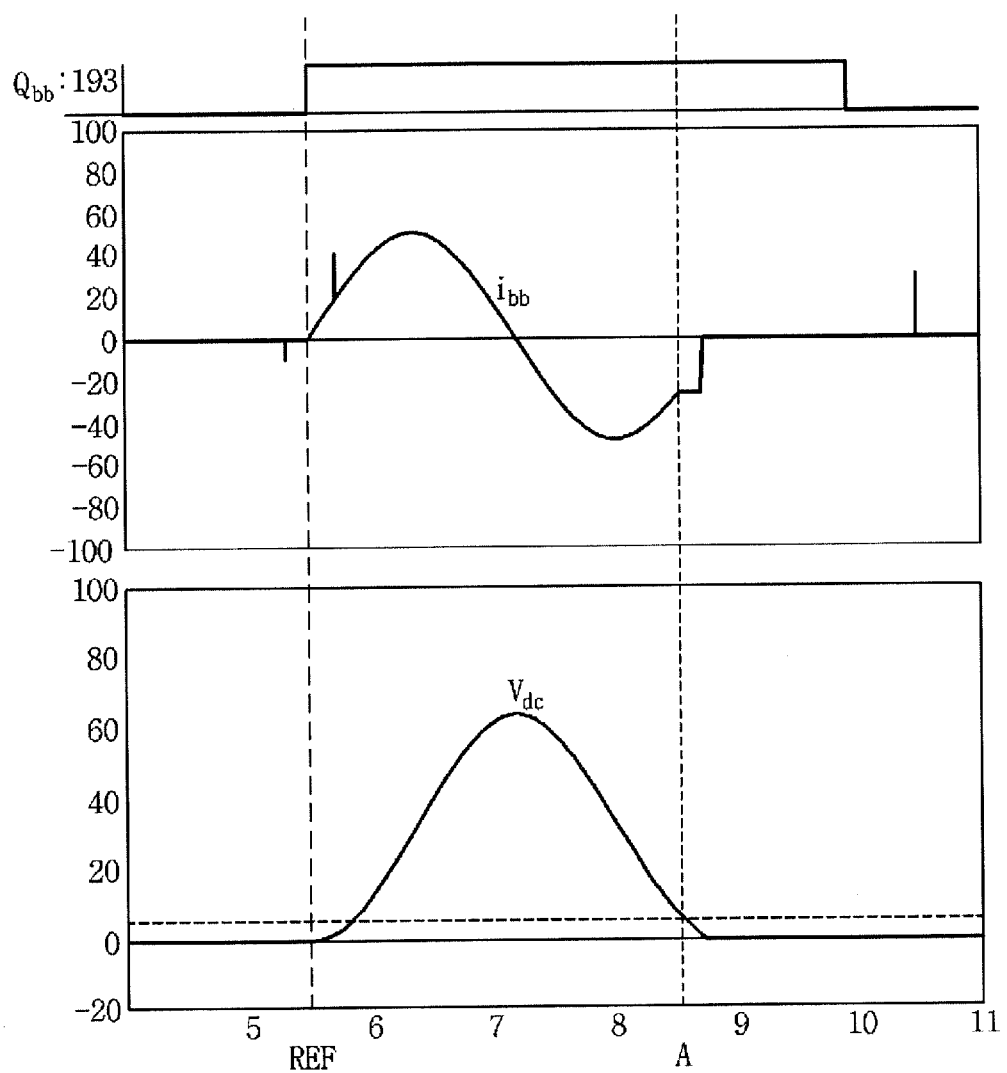
FIG. 8 is a view enlargedly illustrating a dotted line F of FIG. 3.

Referring to FIGS. 6 to 8, it may be understood that the fifth switch element Qa and the seventh switch element Qb may perform the zero voltage switching as illustrated in a dotted line portion D of FIG. 6 and the fifth switch element Qa and the seventh switch element Qb may perform the zero current switching as illustrated in a dotted line portion E. It may be understood that a current ibb flowing in the eighth switch element Qbb as illustrated in FIG. 7 is resonated and forms a sine waveform, as illustrated in FIG. 8 and a voltage at both ends of the second resonator 122b, i.e., a Vdc voltage forms a sine wave and thus the zero voltage switching and the zero current switching are enabled. And it may be understood that a resonance current ibb becomes zero before the drive signal of the eighth switch element Qbb is turned off. Further, a current is flowing in the fifth switch element Qa is a total current of a current it flowing in the first inductor L1, a current i2 flowing in the second inductor L2 and the resonance current ibb, and thus the zero current switching may be enabled, as illustrated in FIG. 6. Also, a current ib flowing in the seventh switch element Qb is a total current of the current it flowing in the first inductor L1, the current i2 flowing in the second inductor L2 and a resonance current iaa, and thus the zero current switching may be enabled, as illustrated in FIG. 6.

As described above, the power converter 100 according to the embodiment of the present invention may perform the zero voltage switching and the zero current switching, may reduce the switching loss due to a soft switching operation, may reduce a voltage stress, may increase the power conversion efficiency and may also realize low noise.

Furthermore, since the parasitic inductances of the transformer T are absorbed by the first and second inductors L1 and L2 on a resonant circuit of the power converter 100 forming the resonant current and parasitic capacitances are also absorbed by the ninth and tenth capacitors Ck and Cj on the resonant circuit, a turn-on current surge and a turn-off voltage surge due to the parasitic inductances and the parasitic capacitances may be reduced.

Figure 9:
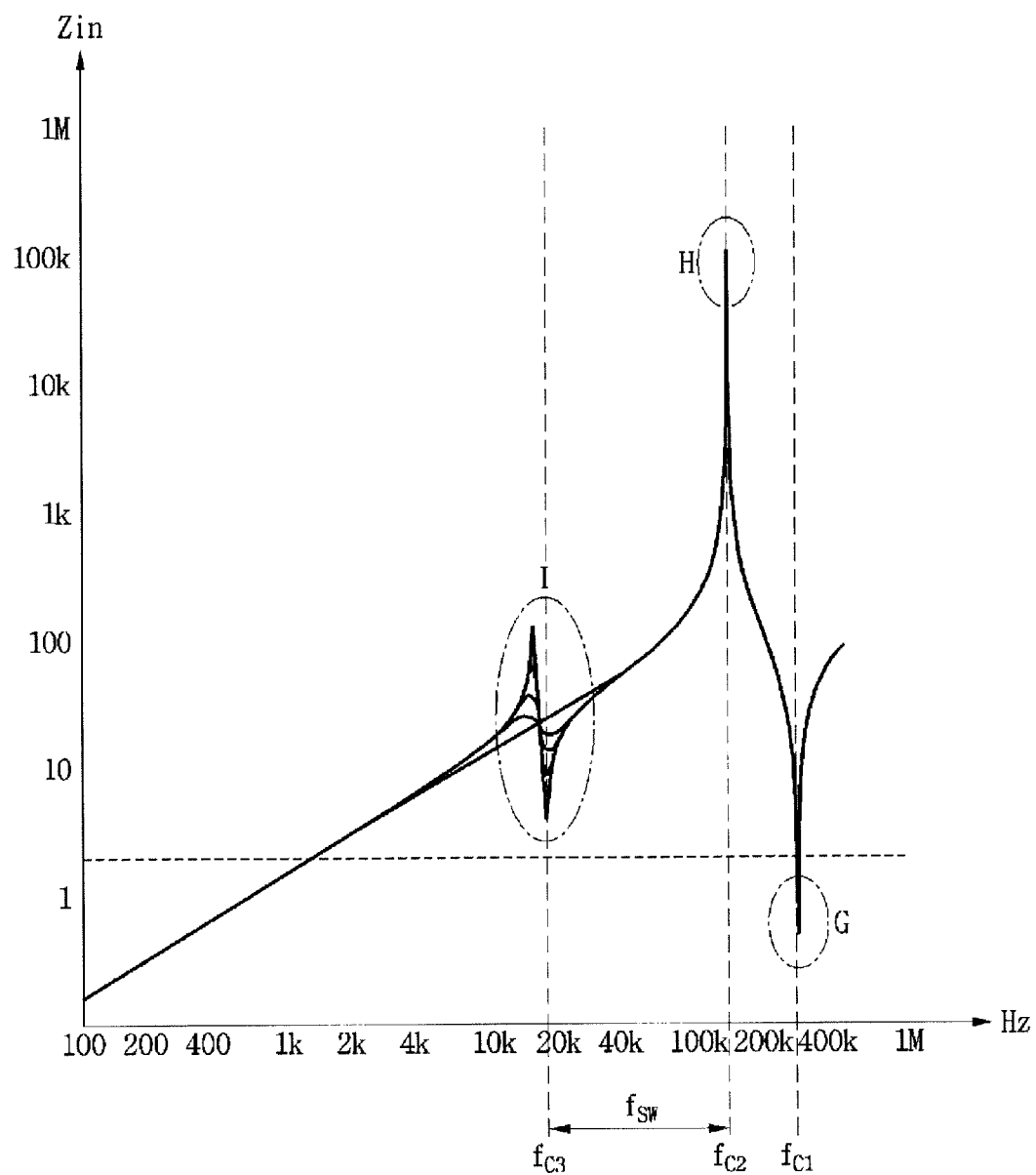
FIG. 9 is a view illustrating an input impedance according to a frequency in the power converter according to the embodiment of the present invention.

FIG. 9 is a view illustrating an input impedance according to a frequency in the power converter according to the embodiment of the present invention.

Referring to FIG. 9, it may be understood that, assuming that an impedance when viewing the secondary side converter 120 from the primary side transformer 112 is an input impedance Zin, a current resonant frequency fc1 is indicated as a dotted line G in the input impedance Zin according to a frequency and a voltage resonant frequency fc2 is indicated as a dotted line H. The current resonant frequency fc1 is a resonant frequency by the first and second inductors L1 and L2 and the ninth and tenth capacitors Ck and Cj of the secondary side converter 120 in the input impedance Zin when a current is resonated, and the input impedance Zin may be minimized. And the voltage resonant frequency fc2 is a resonant frequency by the first and second inductors L1 and L2 and the ninth and tenth capacitors Ck and Cj of the secondary side converter 120 in the input impedance Zin when a voltage is resonated, and the input impedance Zin may be maximized. Therefore, it is preferable that the current and voltage resonant frequencies fc1 and fc2 are determined and the switch elements Q1, Q2, Q3, Q4, Qa, Qaa, Qb and Qbb of the power converter 100 are operated in a frequency lower than the current and voltage resonant frequencies fc1 and fc2. That is, it is preferable that a switching frequency fsw is in a relationship of fsw<fc2<fc1.

Also, a portion of a dotted line I in FIG. 9 is an impedance by a resonant frequency fc3 formed by the first and second inductors L1 and L2 and the load capacitor CL of the secondary side converter 120, and since it is preferable that the switching frequency fsw is larger than the resonant frequency fc3, the switching frequency fsw may be in a relationship of fc3<fsw<fc2<fc1.

<Backward Operation of Power Converter: Boost Mode Operation>

Figure 10:
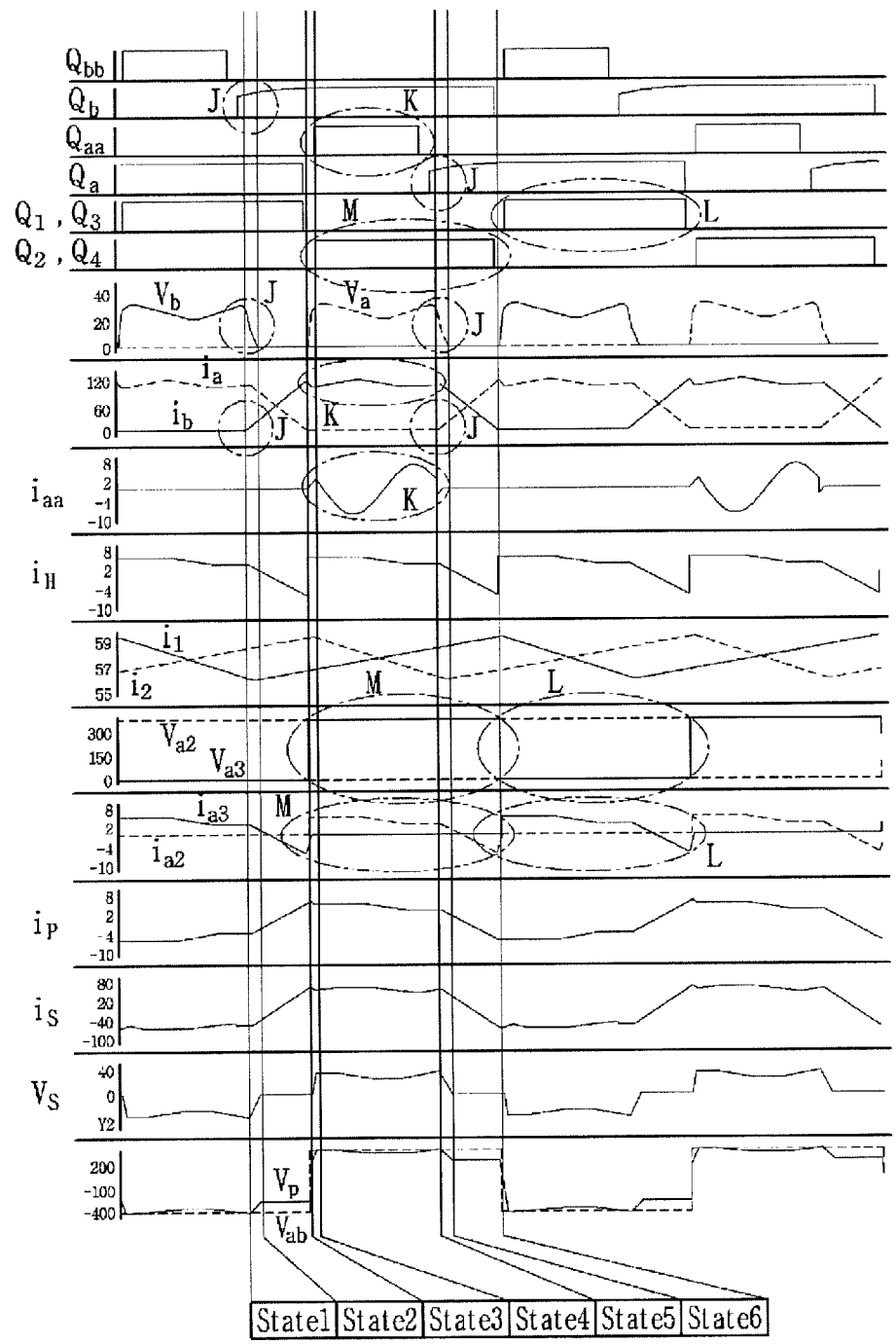
FIG. 10 is a waveform diagram of a boost mode operation of the power converter according to the embodiment of the present invention.

FIG. 10 is a waveform diagram of a boost mode operation of the power converter according to the embodiment of the present invention.

Referring to FIG. 10, the power converter 100 according to the embodiment of the present invention may perform a boost mode operation in which a second voltage VL which is an input voltage is converted into a first voltage VH which is a DC output voltage higher than the second voltage VL.

In the boost mode operation, the operation of the power converter 100 may be divided into first to sixth time sections State 1 to State 6.

<First Time Section State 1>

Figure 11:
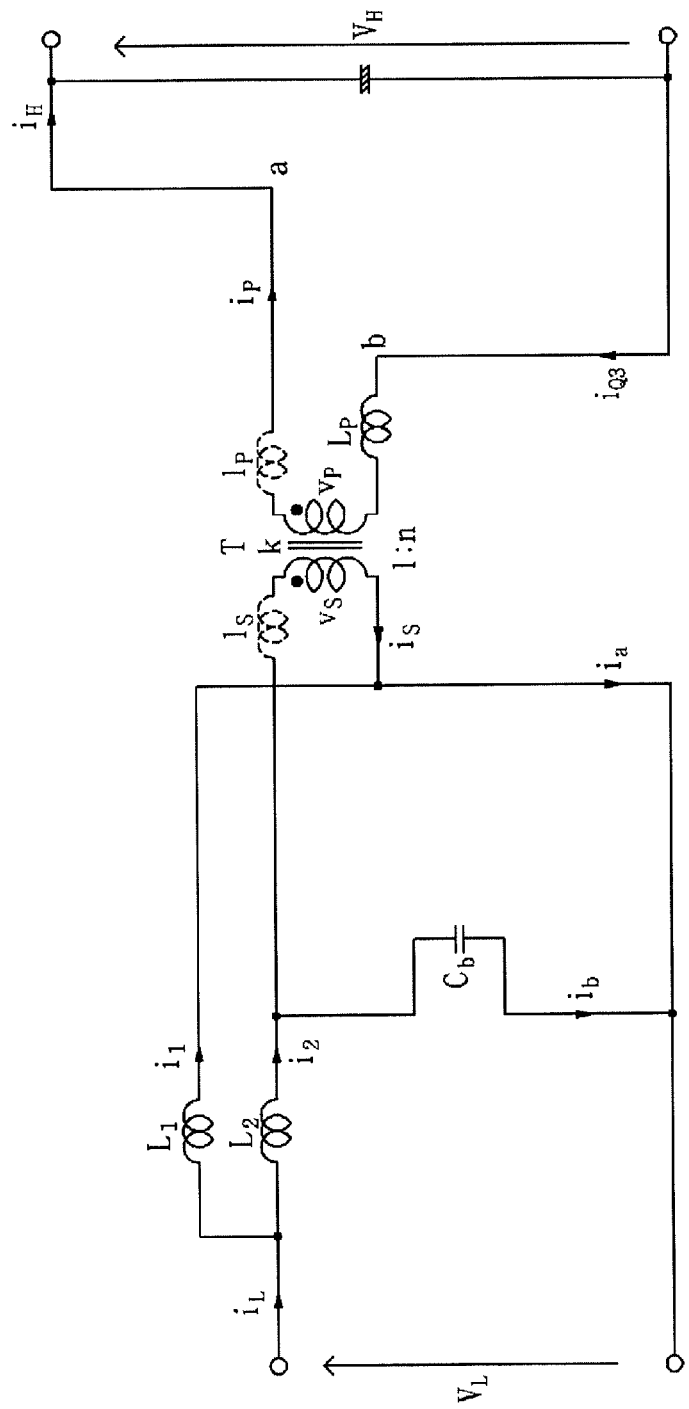
FIG. 11 is an equivalent model in a first time section State 1.

FIG. 11 is an equivalent model in the first time section State 1.

Referring to FIG. 11, in the first time section State 1, the eighth switch element Qbb is turned off, and the seventh switch element Qb starts to be turned on. And the sixth switch element Qaa is turned off, and the fifth switch element Qa is turned on. Also, the first switch element Q1 is turned on, and the second switch element Q2 is turned off. And the third switch element Q3 is turned on, and the fourth switch element Q4 is turned off.

<Second Time Section State 2>

Figure 12:
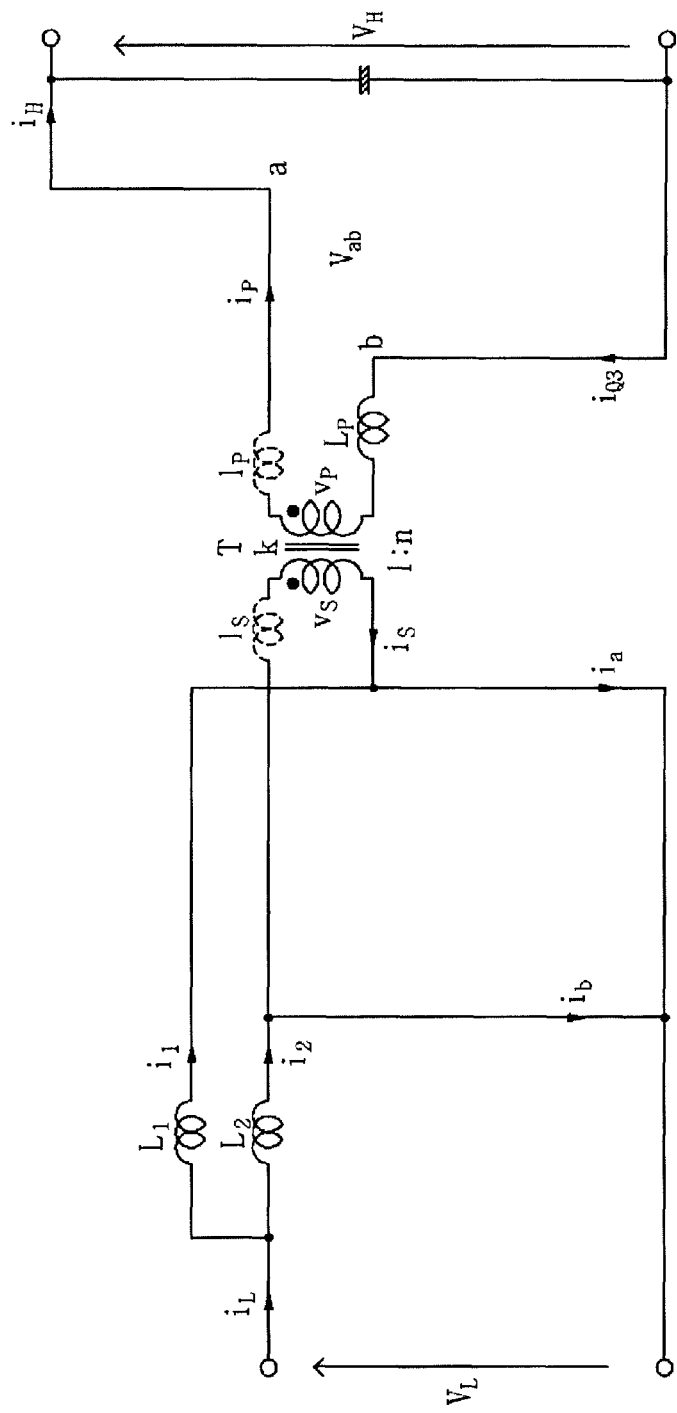
FIG. 12 is an equivalent model in a second time section State 2.

FIG. 12 is an equivalent model in the second time section State 2.

Referring to FIG. 12, in the second time section State 2, the eighth switch element Qbb is turned off, and the seventh switch element Qb is turned on. And the sixth switch element Qaa is turned off, and the fifth switch element Qa is turned on and then turned off at the end of the second time section State 2. Also, the first switch element Q1 is turned on and then turned off at the end of the second time section State 2, and the second switch element Q2 is turned off.

<Third Time Section State 3>

Figure 13:
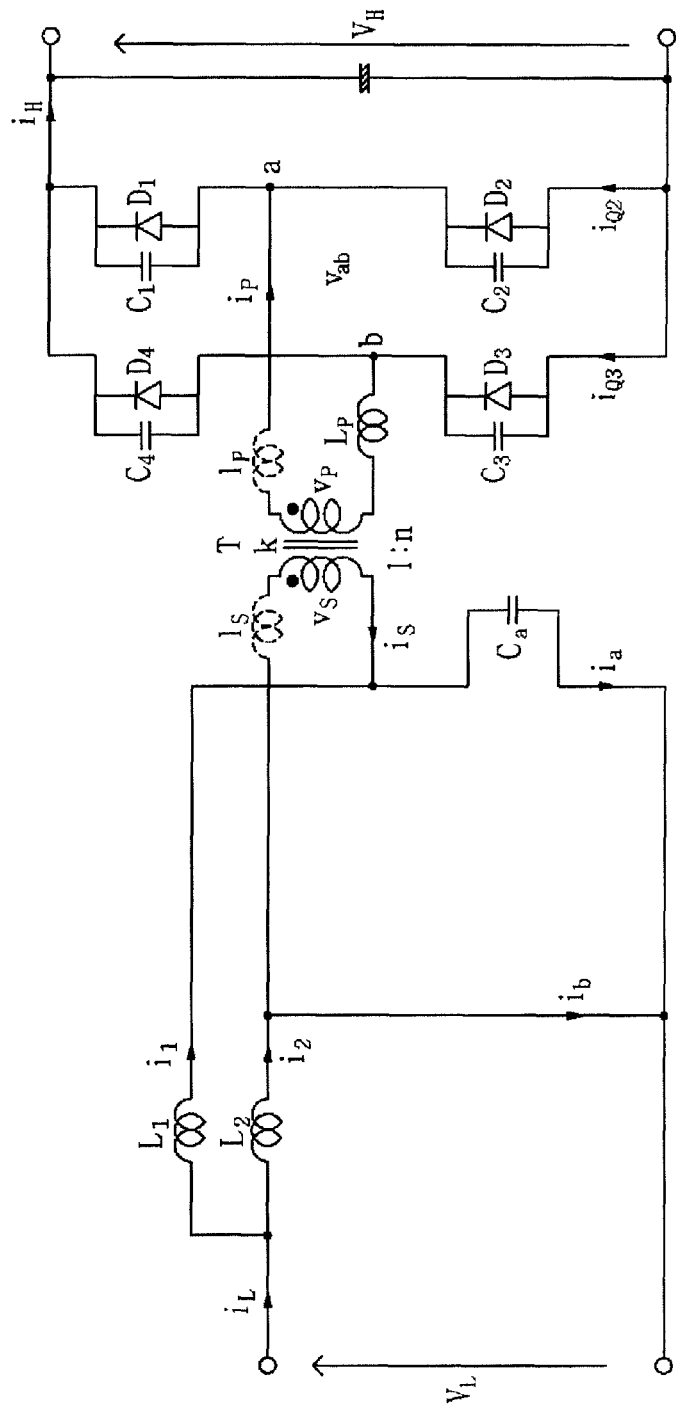
FIG. 13 is an equivalent model in the third time section State 3.

FIG. 13 is an equivalent model in the third time section State 3.

Referring to FIG. 13, in the third time section State 3, the eighth switch element Qbb is turned off, and the seventh switch element Qb is turned on. And the sixth switch element Qaa is turned off and then turned on at the end of the third time section State 3, and the fifth switch element Qa is turned off. Also, the first switch element Q1 is turned off, and the second switch element Q2 is turned off and then turned on at the end of the third time section State 3.

<Fourth Time Section State 4>

Figure 14:
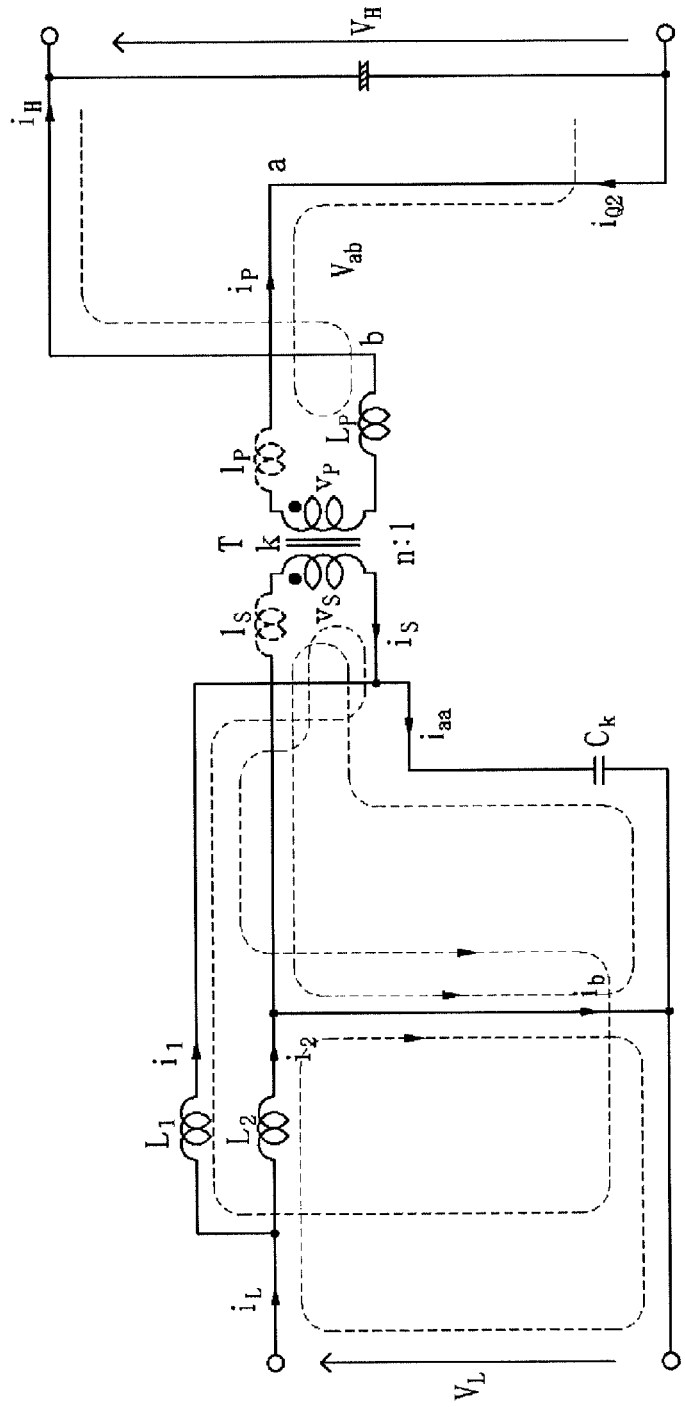
FIG. 14 is an equivalent model in a fourth time section State 4.

FIG. 14 is an equivalent model in the fourth time section State 4.

Referring to FIG. 14, in the fourth time section State 4, the eighth switch element Qbb is turned off, and the seventh switch element Qb is turned on. And the sixth switch element Qaa is turned on and then turned off at the second half of fourth time section State 4, and the fifth switch element Qa is turned off and then starts to be turned on at the second half of the fourth time section State 4. Also, the first switch element Q1 is turned off, and the second switch element Q2 is turned on.

<Fifth Time Section State 5>

Figure 15:
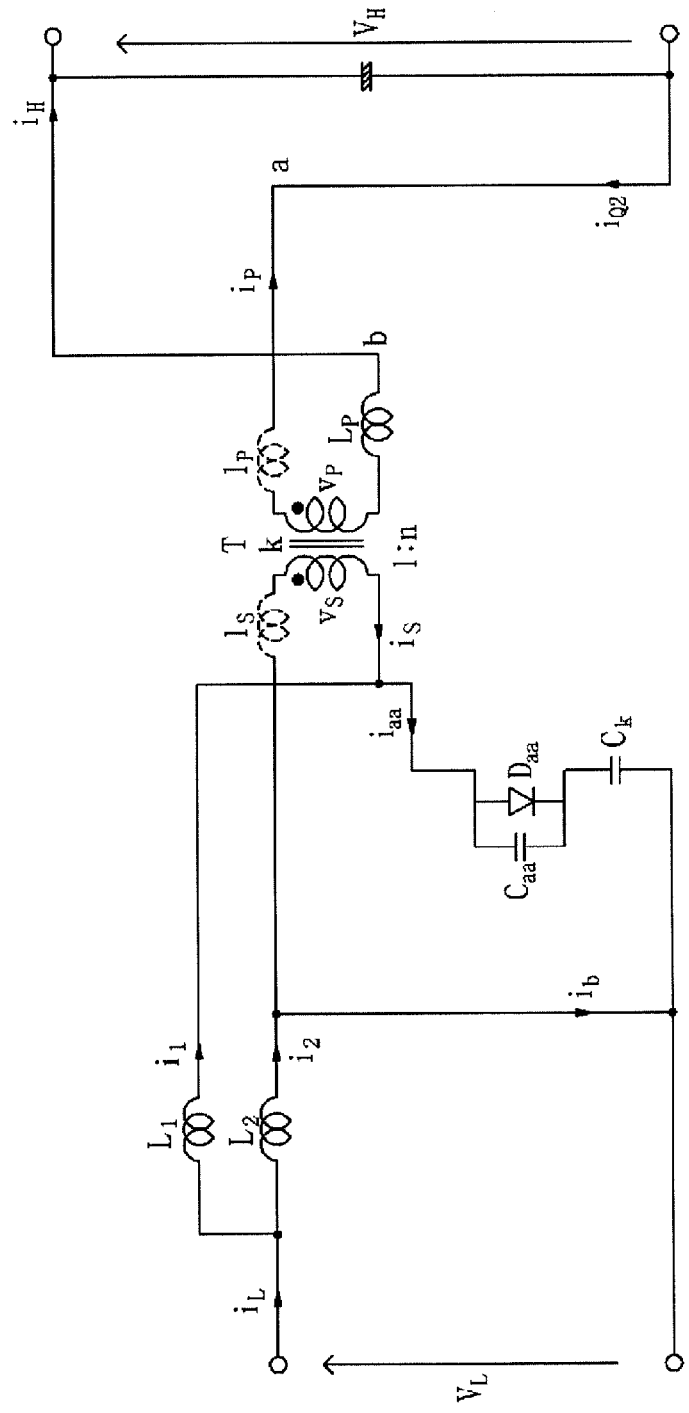
FIG. 15 is an equivalent model in a fifth time section State 5.

FIG. 15 is an equivalent model in the fifth time section State 5.

Referring to FIG. 15, in the fifth time section State 5, the eighth switch element Qbb is turned off, and the seventh switch element Qb is turned on. And the sixth switch element Qaa is turned off, and the fifth switch element Qa starts to be turned on. Also, the first switch element Q1 is turned off, and the second switch element Q2 is turned on.

<Sixth Time Section State 6>

Figure 16:
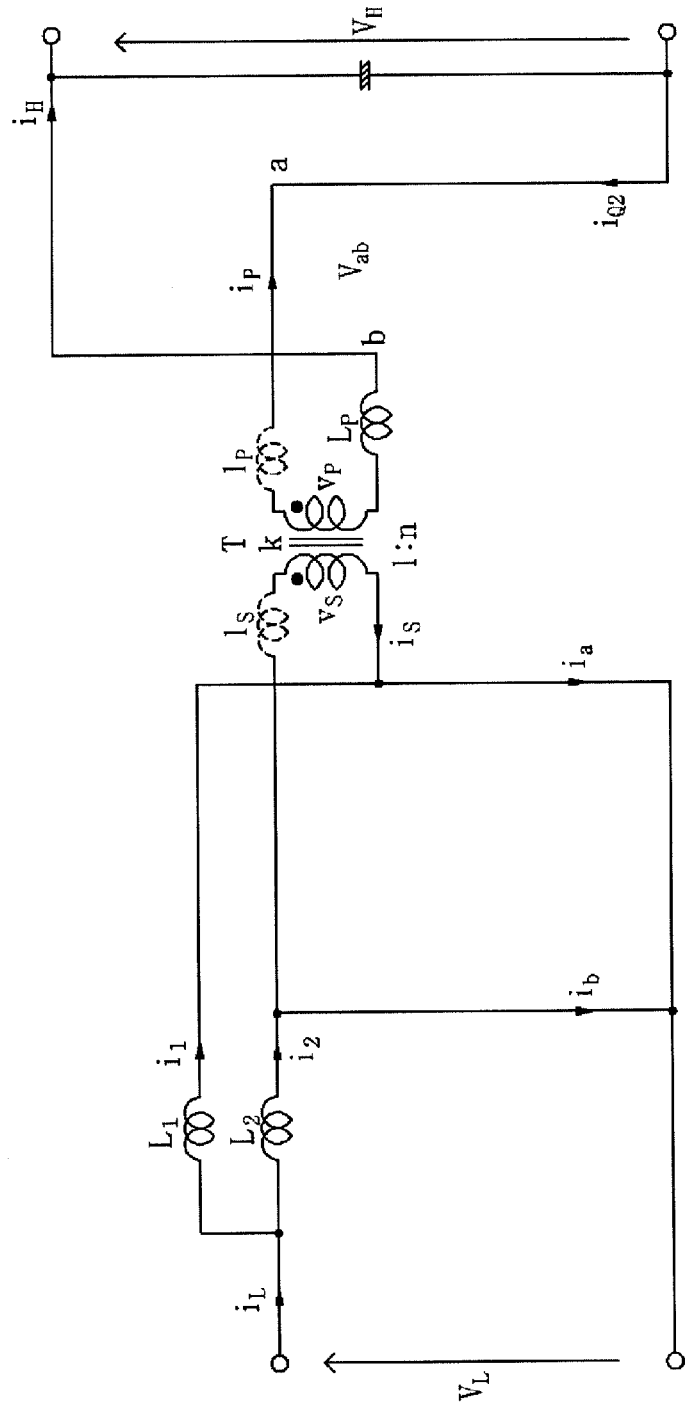
FIG. 16 is an equivalent model in a sixth time section (State 6).

FIG. 16 is an equivalent model in the sixth time section State 6.

Referring to FIG. 16, in the sixth time section State 6, the eighth switch element Qbb is turned off, and the seventh switch element Qb is turned on and then turned off at the end of the sixth time section State 6. And the sixth switch element Qaa is turned off, and the fifth switch element Qa is turned on. Also, the first switch element Q1 is turned off, and the second switch element Q2 is turned on and then turned off at the end of the sixth time section State 6.

Figure 17:
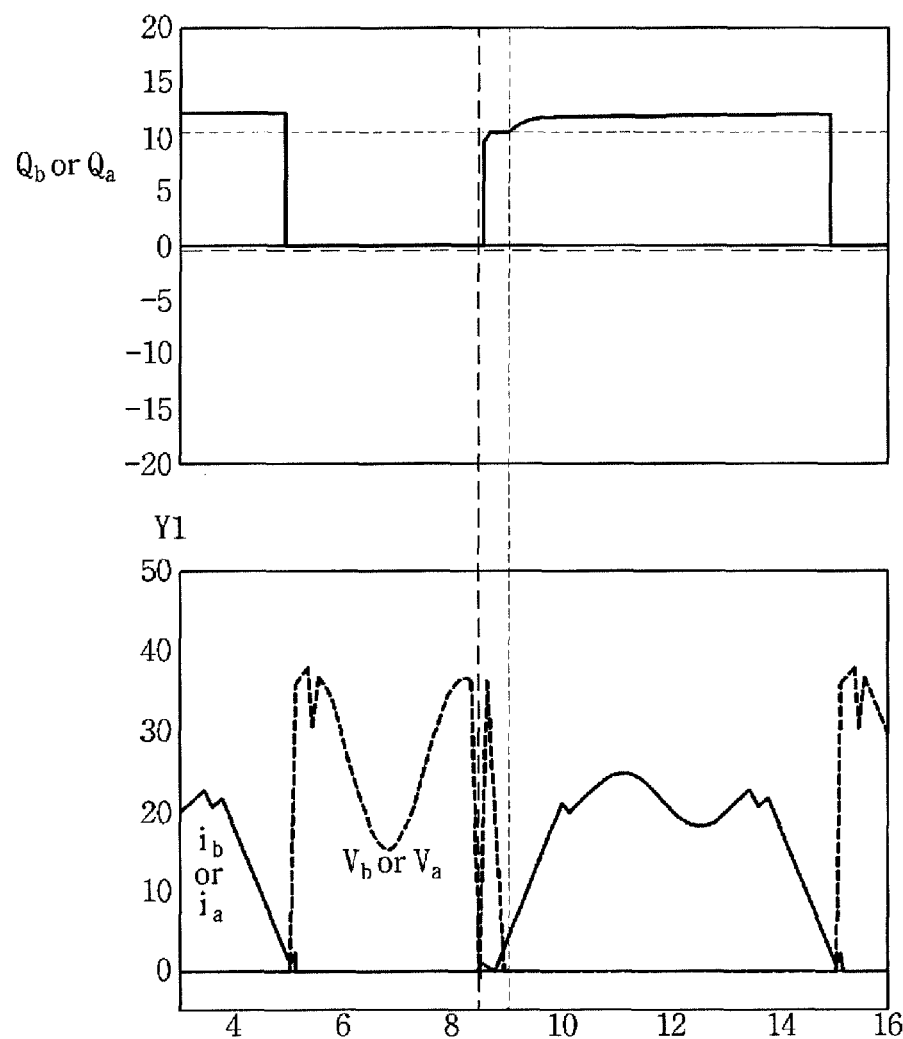
FIG. 17 is an enlarged view of a J region in the waveform diagram of FIG. 10.

FIG. 17 is an enlarged view of a J region in the waveform diagram of FIG. 10.

Referring to FIG. 17, when the seventh switch element Qb is turned on or the fifth switch element Qa is turned on, the zero voltage and the zero current switching operations may be performed. That is, it may be understood that the zero voltage and the zero current are achieved at the time when the seventh switch element Qb or the fifth switch element Qa is turned on and turned off, and thus it may also be understood that the zero current and zero voltage switching operations ZVS and ZCS are enabled. As illustrated in a simulation waveform of FIG. 17, it may be understood that the voltage Vb or Va at the both ends of the seventh switch element Qb or the fifth switch element Qa and the current ib or ia flowing in the seventh switch element Qb or the fifth switch element Qa has a substantially zero value and thus the switching loss does not occur. Also, a time point when the seventh switch element Qb is turned on may be in the first timed section State 1. At this time, an equivalent circuit diagram (of FIG. 11) in the first time section State 1 may be converted into an equivalent circuit diagram (of FIG. 12) in the second. time section State 2 through the zero current and zero voltage switching operations. And a time point when the fifth switch element Qa is turned on may be in the fifth timed section State 5. At this time, an equivalent circuit diagram (of FIG. 15) in the fifth time section State 5 may be converted into an equivalent circuit diagram (of FIG. 16) in the sixth time section State 6 through the zero current and zero voltage switching operations.

Figure 18:
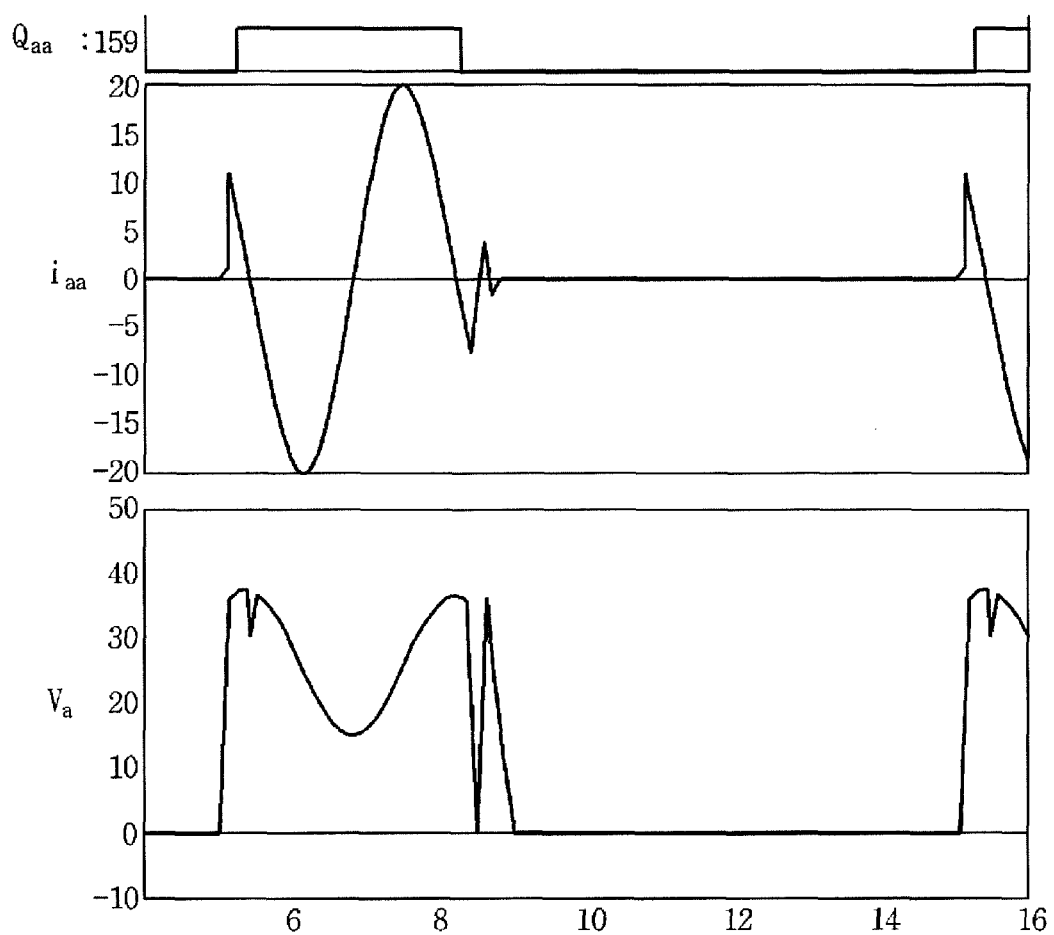
FIG. 18 is an enlarged view of a dotted line portion K in the waveform diagram of FIG. 10.

FIG. 18 is an enlarged view of a dotted line portion K in the waveform diagram of 10.

Referring to FIG. 18, the resonant current ibb or iaa may flow in the eighth or sixth switch element Qbb or Qaa by the first and second resonators 122a and 122b. That is, as illustrated in FIG. 18, it may be understood that the current iaa flowing in the sixth switch element Qaa in the fourth time section State 4 forms a sine waveform and thus becomes the resonant current, and this may be equally applied to the resonant current ibb flowing in the eighth switch element Qbb. And the current ib flowing in the seventh switch element Qb is the total current of the current i1 and the current i2 flowing in the first inductor L1 and the second inductor L2 respectively and the resonant current iaa flowing in the sixth switch element Qaa. Therefore, in an interpretation of the current ib flowing in the seventh switch element Qb in an arrow direction, the current ib flowing in the seventh switch element Qb is indicated by a sum of the current i1 and the current i2 flowing in the first inductor L1 and the second inductor L2 respectively and a reversed current −iaa of the resonant current iaa, and thus it may be understood that the current ib flowing in the seventh switch element Qb has a slight ripple due to the resonance current iaa and the level thereof is increased by the total current of i1 and i2.

Figure 19:
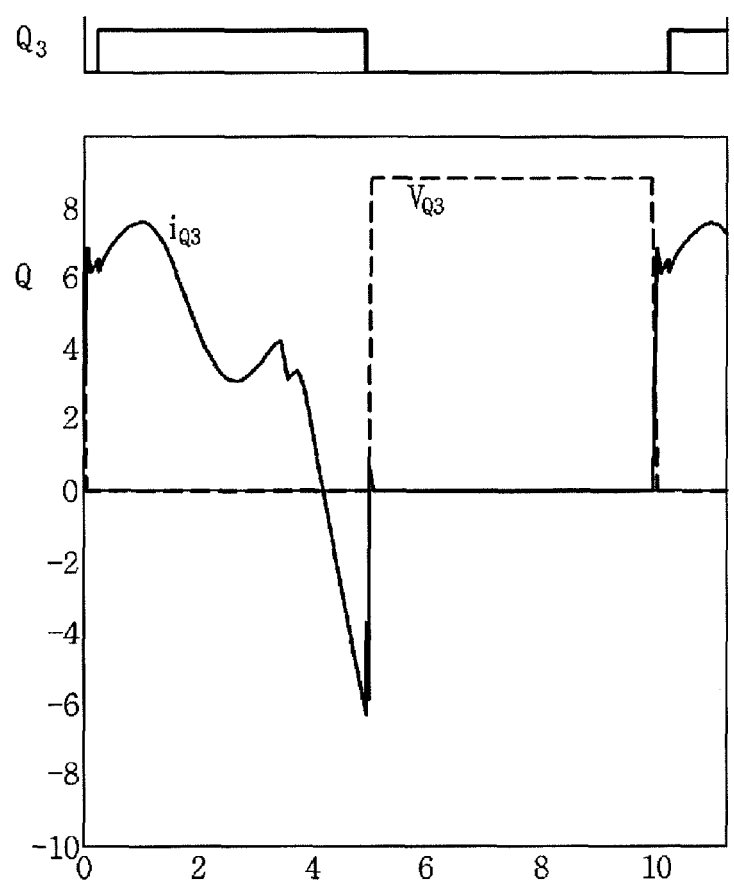
FIG. 19 is an enlarged view of a dotted line portion L in the waveform diagram of FIG. 10.
Figure 20:
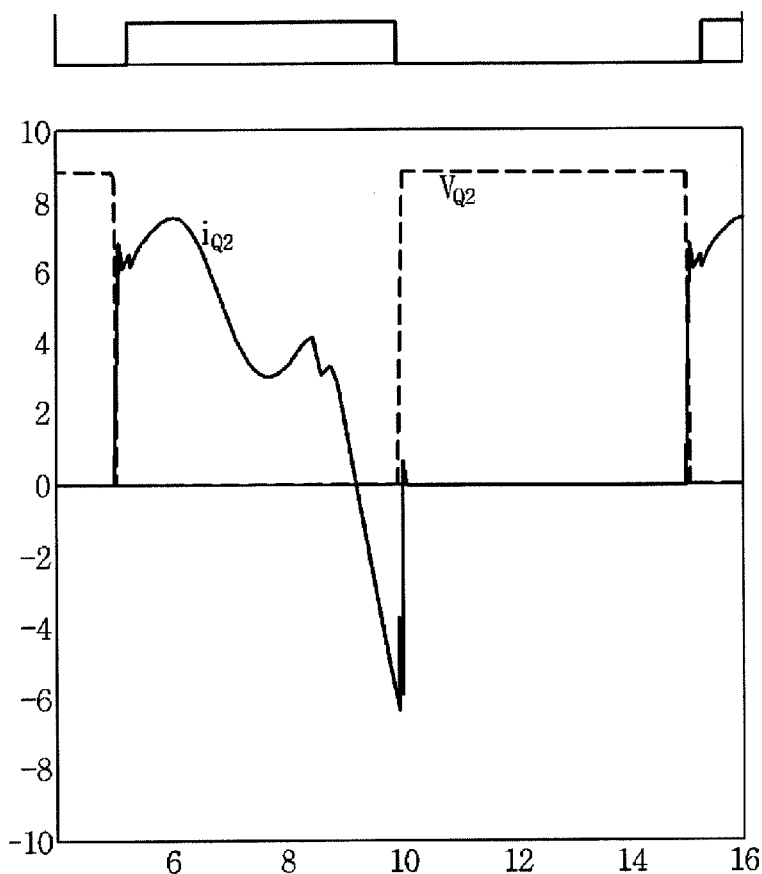
FIG. 20 is an enlarged view of a dotted line portion M in the waveform diagram of FIG. 10.

FIG. 19 is an enlarged view of a dotted line portion L in the waveform diagram of FIG. 10, and FIG. 20 is an enlarged view of a dotted line portion M in the waveform diagram of FIG. 10.

Referring to FIGS. 19 and 20, it may be understood that the second and third switch elements Q2 and Q3 perform the zero voltage switching in the third time section State 3 and the sixth time section State 6, and this may be equally applied to the first and fourth switch elements Q1 and Q4.

As described above, the power converter 100 according to the embodiment of the present invention may perform the zero voltage switching and the zero current switching, may reduce the switching loss due to the soft switching operation, may reduce the voltage stress, may increase the power conversion efficiency and may also realize low noise.

Furthermore, since the parasitic inductances of the transformer T are absorbed by the first and second inductors L1 and L2 on the resonant circuit of the power converter 100 forming the resonant current and the parasitic capacitances are also absorbed by the ninth and tenth capacitors Ck and Cj on the resonant circuit, the turn-on current surge and the turn-off voltage surge due to the parasitic inductances and the parasitic capacitances may be reduced.

Figure 21:
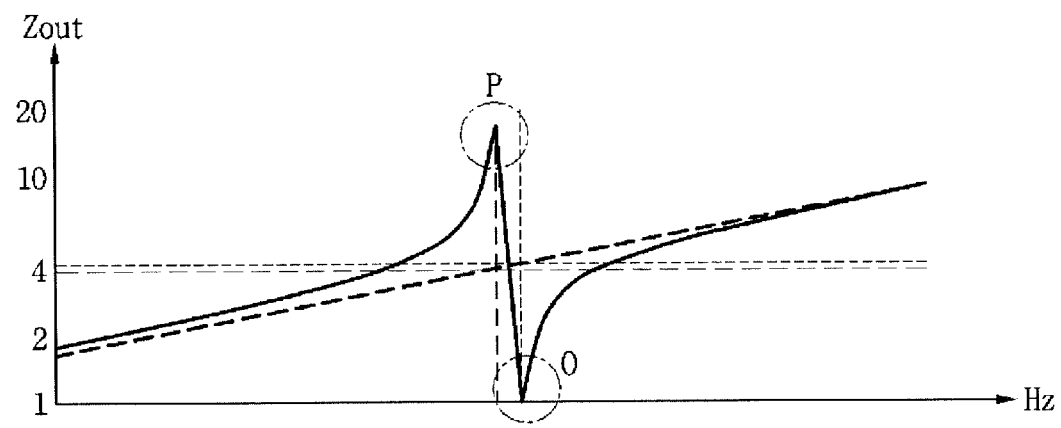
FIG. 21 is a view illustrating an output impedance according to a frequency in the power converter according to the embodiment of the present invention.

FIG. 21 is a view illustrating an output impedance according to a frequency in the power converter according to the embodiment of the present invention.

An output impedance Zout is defined as an impedance when viewing the primary side converter 110 while the load part 123 of the secondary side converter 120 is disconnected.

Referring to FIG. 21, a dotted line O corresponds to the current resonant frequency fc1, and the current resonant frequency fc1 may be determined by the first and second inductors L1 and L2, the ninth and tenth capacitors Ck and Cj and the primary side inductor Lp. And a dotted line P corresponds to the voltage resonant frequency fc2, and the voltage resonant frequency fc2 may also be determined by the first and second inductors L1 and L2, the ninth and tenth capacitors Ck and Cj and the primary side inductor Lp. In the current resonant frequency fc1, the impedance may be minimized, and in the voltage resonant frequency fc2, the impedance may be maximized. And it is preferable that the switch elements Q1, Q2, Q3, Q4, Qa, Qaa, Qb and Qbb of the power converter 100 are operated in a frequency lower than the current and voltage resonant frequencies fc1 and fc2. That is, it is preferable that the switching frequency fsw is in a relationship of fsw<fc2<fc1.

Although a few embodiments of the present invention have been shown and described, it would be appreciated by those skilled in the art that changes may be made in these embodiments without departing from the principles and spirit of the invention, the scope of which is defined in the claims and their equivalents. Therefore, the technical scope of the present invention is not limited to the detailed description in the specification but should be limited to the claims.

INDUSTRIAL APPLICABILITY

The present invention can be used in a technical field in which the electric power is converted.

The invention claimed is:
1. A power converter comprising:
a transformer;
a current doubler configured to double a current of the transformer according to an operation of a first switch element connected to one end of a secondary side of the transformer and a second switch element connected to the other end of the secondary side of the transformer;
a voltage resonator connected to each of the first and second switch elements in parallel; and
a load part that is connected to both ends of the current doubler,
wherein the voltage resonator includes a third switch element, a fourth switch element, a first capacitor, and a second capacitor,
wherein a step-down operation that reduces a level of DC voltage input to an inverter rectification type converter and then outputs the DC voltage from the load part or a step-up operation that increases a level of a DC voltage input to the load part and then outputs the DC voltage from the inverter rectification type converter is performed, and
wherein a current flowing in each of the third and fourth switch elements is resonated when the step-down operation or the step-up operation is performed.

2. The power converter of claim 1, wherein the voltage resonator includes a first voltage resonator which is connected to the first switch element and a second voltage resonator which is connected to the second switch element, and the first voltage resonator includes the third switch element and the first capacitor which are connected to each other in series, and the second voltage resonator includes the fourth switch element and the second capacitor which are connected to each other in series.

3. The power converter of claim 2, wherein the first switch element and the third switch element are alternately operated with a dead time, and the second switch element and the third switch element are alternately operated with a second dead time.

4. The power converter of claim 3, further comprising an inverter rectification type converter which is connected to a primary side of the transformer, converts an input voltage into a square wave pulse waveform and then outputs the converted square wave pulse waveform to the primary side of the transformer.

5. The power converter of claim 1, wherein the current doubler includes first and second inductors each of which one terminal is connected to each other, and the other terminal of the first inductor is connected to one terminal of the secondary side of the transformer, and the other terminal of the second inductor is connected to the other terminal of the secondary side of the transformer, and a current flowing in each of the first and second inductors and a resonant current flowing in the fourth switch element flow in the first switch element when the step-down operation or the step-up operation is performed.

6. The power converter of claim 5, wherein, when the step-down operation or the step-up operation is performed, the first and fourth switch elements are connected, and the second and third switch elements are disconnected, and thus the current flowing in each of the first and second inductors and the resonant current flowing in the fourth switch element flow in the first switch element.

7. The power converter of claim 1, wherein a voltage applied to both ends of each of the first and second voltage resonators has a sine wave when the step-down operation is performed.

8. The power converter of claim 1, wherein the current doubler includes first and second inductors each of which one terminal is connected to each other, and the other terminal of the first inductor is connected to one terminal of the secondary side of the transformer, and the other terminal of the second inductor is connected to the other terminal of the secondary side of the transformer, and a current flowing in each of the first and second inductors and a resonant current flowing in the third switch element flow in the second switch element when the step-down operation or the step-up operation is performed.

9. The power converter of claim 8, wherein, when the step-down operation or the step-up operation is performed, the second and third switch elements are connected, and the first and fourth switch elements are disconnected, and thus the current flowing in each of the first and second inductors and the resonant current flowing in the third switch element flow in the second switch element.

10. A power converter comprising:
an insulation transformer;
fifth and seventh switch elements connected between one terminal of a secondary side of the insulation transformer and a first node;
a first inductor connected between one terminal of the secondary side of the insulation transformer and a second node;
a second inductor connected between the other terminal of the secondary side of the insulation transformer and the second node;
a first resonator connected to the fifth switch element in parallel and including a sixth switch element and a first capacitor; and
a second resonator connected to the seventh switch element in parallel and including an eighth switch element and a second capacitor.

11. The power converter of claim 10, wherein each of the fifth to eighth switch elements includes an internal diode and an internal capacitor.

12. The power converter of claim 10, wherein the fifth to eighth switch elements are MOSFET transistors, and drain terminals of the fifth and seventh switch elements and source terminals of the sixth and eighth switch elements are commonly connected to one terminal of the insulation transformer.

13. The power converter claim 10, wherein the sixth switch element and the first capacitor are connected in series, and the eighth switch element and the second capacitor are connected in series.

14. The power converter of claim 13, further comprising an inverter rectification type converter which is connected to a primary side of the insulation transformer, converts an input voltage into a square wave pulse waveform and then outputs the converted square wave pulse waveform to the primary side of the transformer.

15. The power converter of claim 14, wherein the inverter rectification type converter is a full bridge circuit including first to fourth switch elements.

16. The power converter of claim 15, further comprising a load capacitor which is connected between the first and second nodes.

17. The power converter of claim 16, wherein a step-down operation which reduces a level of a DC voltage input to the inverter rectification type converter and then outputs the DC voltage from the load part or a step-up operation which increases a level of a DC voltage input to the load part and then outputs the DC voltage from the inverter rectification type converter is performed.

18. The power converter of claim 14, further comprising a primary side inductor which is connected to the primary side of the insulation transformer.

* * * * *